United States Patent
Randall et al.

(10) Patent No.: US 12,338,787 B2
(45) Date of Patent: Jun. 24, 2025

(54) SHEAR WEB FOR A WIND TURBINE BLADE AND METHOD OF MAKING SAME

(71) Applicant: VESTAS WIND SYSTEMS A/S, Aarhus N (DK)

(72) Inventors: Stephen Randall, Cowes (GB); Jeremy Haight, Arvada, CO (US)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/571,100

(22) PCT Filed: May 20, 2022

(86) PCT No.: PCT/DK2022/050101
§ 371 (c)(1),
(2) Date: Dec. 15, 2023

(87) PCT Pub. No.: WO2022/262916
PCT Pub. Date: Dec. 22, 2022

(65) Prior Publication Data
US 2024/0280077 A1    Aug. 22, 2024

Related U.S. Application Data

(60) Provisional application No. 63/211,136, filed on Jun. 16, 2021.

(30) Foreign Application Priority Data

Aug. 18, 2021  (DK) .............................. PA202170416

(51) Int. Cl.
*F03D 1/06* (2006.01)
*B29D 99/00* (2010.01)
(Continued)

(52) U.S. Cl.
CPC ....... *F03D 1/0677* (2023.08); *B29D 99/0028* (2013.01); *B33Y 80/00* (2014.12);
(Continued)

(58) Field of Classification Search
CPC ....... Y02E 10/72; Y02E 10/74; F03D 1/0675; F03D 1/0633; F03D 1/06; F03D 3/062;
(Continued)

(56) References Cited

U.S. PATENT DOCUMENTS 8,870,547 B2 * 10/2014  Grase .................. B64C 1/06
416/500
2017/0204833 A1    7/2017  Albert et al.
(Continued)

FOREIGN PATENT DOCUMENTS

CN    101457781 A    6/2009
EP    2679804 A1    1/2014
(Continued)

OTHER PUBLICATIONS

PCT, International Search Report and Written Opinion of The International Searching Authority for Application PCT/DK2022/050101 dated Oct. 17, 2022.
(Continued)

*Primary Examiner* — Eric J Zamora Alvarez
(74) *Attorney, Agent, or Firm* — Patterson + Sheridan, LLP

(57) ABSTRACT

A shear web for a wind turbine blade includes a lower flange, an upper flange and a web structure extending between the lower and upper flanges, wherein at least one of the lower
(Continued)

flange, upper flange, and the web structure includes an open lattice structure having a plurality of elongate fibrous composite spindles intersecting each other at multiple nodes of the structure. A method of making the shear web using a continuous fiber-reinforced additive manufacturing method is also disclosed.

47 Claims, 19 Drawing Sheets

(51) Int. Cl.
  *B33Y 80/00* (2015.01)
  *B29K 105/08* (2006.01)
(52) U.S. Cl.
  CPC ....... *B29K 2105/08* (2013.01); *F05B 2230/23* (2013.01); *F05B 2240/302* (2013.01); *F05B 2280/6003* (2013.01)
(58) Field of Classification Search
  CPC .......... F03D 3/06; F03D 1/065; F03D 1/0677; F05B 2280/6003; F05B 2230/23; F05B 2230/31; F05B 2240/301; F05B 2240/21; F05B 2280/4007; F05B 2240/302; F05B 2240/30; B29D 99/0028; B33Y 80/00; B29K 2105/08
  See application file for complete search history.

(56) References Cited

U.S. PATENT DOCUMENTS

| | | | |
|---|---|---|---|
| 2018/0156190 A1* | 6/2018 | Johnson | F03D 1/0675 |
| 2018/0264749 A1* | 9/2018 | Albert | B33Y 10/00 |
| 2019/0264651 A1* | 8/2019 | Wardropper | B25B 5/14 |

FOREIGN PATENT DOCUMENTS

| | | |
|---|---|---|
| EP | 2881580 A1 | 6/2015 |
| JP | 2019065105 A | 4/2019 |
| WO | 2010026903 A1 | 3/2010 |
| WO | 2018082755 A1 | 5/2018 |
| WO | 2019212551 A1 | 11/2019 |

OTHER PUBLICATIONS

Danish Patent and Trademark Office, 1st Technical Examination including the Search Report and Search Opinion for Application PA 2021 70416 dated Feb. 24, 2022.

* cited by examiner

SHEAR WEB FOR A WIND TURBINE BLADE AND METHOD OF MAKING SAME

TECHNICAL FIELD

This invention relates generally to wind turbines, and more particularly to a shear web for a wind turbine blade having improved strength-to-weight characteristics. The invention also relates to an improved method of manufacturing the shear web that provides greater design flexibility, which in turn provides improved load distributions and allows the shear web to be tailored more directly to expected load conditions on the blade during use.

BACKGROUND

Wind turbine generators are used to produce electrical energy using a renewable resource and without combusting a fossil fuel. A wind turbine generator converts kinetic energy from the wind into electrical energy, and includes a tower, a nacelle mounted atop the tower, a rotor hub rotatably supported by the nacelle, and a plurality of rotor blades attached to the hub. The hub is coupled to a generator housed inside the nacelle. Consequently, as wind forces the blades to rotate, electrical energy is produced by the generator. In recent years, wind power has become a more attractive alternative energy source and the number of wind turbines, wind farms, etc. has significantly increased, both on land and offshore. Additionally, the size of wind turbines has also significantly increased, with modern wind turbine blades extending between 50 to 100 meters or more in length, and the length of wind turbine blades is expected to further increase in the future.

Modern wind turbine blades have a construction that typically includes an outer shell and a spar structure located inside the outer shell. The outer shell provides the aerodynamic aspect of the blade and includes a profile configured to generate lift from the oncoming wind that ultimately causes the blades to rotate. The outer shell typically has a laminate composite construction of a plurality of fiber layers, one or more core materials embedded within the fiber layers, and a resin matrix, and includes a windward half shell and a leeward half shell bonded together at leading and trailing edges of the blade. The spar structure on the inside of the blade provides the load-bearing aspects of the blade. In one known arrangement, the spar structure includes a pair of spar caps and one or more shear webs extending therebetween. The spar caps may be arranged in opposing relation across the height of the blade, with one spar cap being associated with the windward shell half and the other spar cap being associated with the leeward shell half. The spar caps may be integrated into the outer shell such that the spar caps form a portion of the outer shell. Alternatively, the spar caps may be adhesively bonded to an inner surface of the outer shell. The spar caps extend longitudinally along the majority of the length of the wind turbine blade, and in one arrangement may be formed from a stack of pultruded strips of carbon-fiber reinforced plastic.

The shear web is connected between the spar caps and includes an intermediate web and first and second flanges provided at respective first and second ends of the intermediate web. As such, the shear web is substantially I-shaped in cross section and bridges the gap between the windward and leeward sides of the outer shell. The flanges are oriented transversely to the intermediate web when viewed in cross section and provide a means for mounting the shear web between the opposed spar caps. In this regard, the flanges are configured to be bonded to the spar caps by means of adhesive. In one known arrangement, the first and second flanges may be formed from a T-shaped pultrusion of carbon-fiber reinforced plastic and include a foot and an upstand, where the foot forms the flange and the upstand facilitates a connection of the foot to the intermediate web. The intermediate web typically has a laminate composite construction of a plurality of fiber layers, one or more core materials embedded within the fiber layers, and a resin matrix. Depending on the size of the blade and expected loads, the spar structure may include more than one shear web extending between the opposed spar caps.

The outer shell is typically made through a moulding process using a windward mould half and a leeward mould half. In this regard, the fiber layers, such as glass and/or carbon fiber layers, and the core material, such as various foam and/or wood cores, may be laid in the moulds (along with the spar caps when such spar caps are integrated into the outer shell) and resin is admitted into the moulds in a vacuum-assisted resin transfer moulding process (VARTM). The shell halves are then cured within the respective mould halves. The shear web, and more particularly at least the intermediate web thereof, is also typically made through a moulding process using a separate mould tool. In a similar manner, fiber layers, core material, and the T-shaped pultrusions may be laid in the mould tool and resin is admitted into the mould in a vacuum-assisted resin transfer moulding process. The shear web is then cured within the mould. To form the blade, the shear web may be positioned within one of the blade mould halves and one of the flanges of the shear web adhesively bonded to the spar cap associated with the respective shell half. The other shell half (not having the shear web) may then be juxtapositioned relative to the mould half including the shear web. The outer shell may be adhesively bonded along the leading and trailing edges of the blade and the other flange of the shear web may be adhesively bonded to the spar cap associated with the other shell half.

While the wind turbine blade described above and the method of manufacturing the wind turbine blade has proven successful, wind turbine blade manufacturers continually seek improved designs and manufacturing methods, especially as the size of wind turbine blades is expected to increase. In this regard, current manufacturing processes have inherent limitations to design improvements for wind turbine blades. For example, current moulding processes primarily rely on laminate composite constructions (e.g., fiber layers, core material, and resin) for making the outer shell and shear webs of wind turbine blades. Thus, the manufacturing process itself results in certain design constraints that limit a manufacturer's ability to improve wind turbine blade performance.

Additionally, current moulding processes for wind turbine blades lack adaptability that further limits wind turbine blade design. As one can appreciate from a scale perspective, the time and capital investment for producing windward and leeward mould halves and the associated fixtures and equipment for handling the mould halves (e.g., to overturn one mould half relative to the other mold half) are prohibitive. This slow time scale and large capital investment inherent in mould-making not only increases the overall cost of the product offering (e.g., a wind turbine or wind turbine blade) but also limits the ability of a manufacturer to make changes to a blade design during the product life cycle (i.e., cast moulds cannot be easily or cost-effectively altered to accommodate design changes). Thus, a manufacturer has to be fully committed to a certain blade design for an extended period of time in order to obtain a reasonable return on that investment. Inherent aspects of the moulding process and the inability to make changes during the product life cycle often require that the blade be over constrained in its design. More particularly, instead of a detailed, localized design configuration of, for example, the outer shell or the shear web, based on (expected) localized load conditions on the blade, more global design configurations are used that satisfy worst-case load constraints for critical areas of the blade. Thus, much of the blade includes a design configuration that is over constrained for the loads expected in those sections of the blade. This not only represents an unnecessary increase in materials costs (e.g., fiber, resin and core material), but may also represent an unnecessary increase in the overall weight of the shear web and blade.

Furthermore, the loads imposed on the outer shell of the wind turbine blade during use are ultimately transferred to the root end of the blade via the internal spar structure. However, much of that load transfer between the outer shell and the spar structure occurs over a relatively small area of the flanges centered about the shear web (e.g., an I-shaped shear web) and the outer portions of the flanges away from the shear web carry only a small fraction of the load. This results in poor load distribution and high peak loads in the adhesive bond between the flanges of the shear web and the spar caps.

In view of the above, manufacturers seek an improved method for making a wind turbine blade, including a method of making a shear web for a wind turbine blade, that overcomes the limitations of current moulding processes. Manufacturers also seek an improved wind turbine blade component, including a relatively strong and light weight shear web, that provides detailed, localized design configurations based on expected load conditions and improved load distributions in the bond region between the shear web and the spar caps.

SUMMARY

A shear web for a wind turbine blade that addresses the above deficiencies is disclosed. The shear web includes a lower flange, an upper flange, and a web structure extending between the lower and upper flange. At least one of the lower flange, upper flange, and the web structure includes an open lattice structure having a plurality of elongate fibrous composite spindles intersecting each other at multiple nodes of the open lattice structure. The open lattice structure associated with the shear web may be formed by a continuous fiber-reinforced additive manufacturing process. The open lattice structure provides wind turbine blade components having significantly improved strength-to-weight performance and generally cannot be formed using conventional moulding techniques used in wind turbine blade manufacturing. Moreover, the additive manufacturing process for the blade component provides greater design flexibility and adaptability in blade design not otherwise attainable in current manufacturing processes.

In one embodiment, the web structure includes a three-dimensional open lattice structure extending between the lower and upper flanges, wherein the plurality of elongate fibrous composite spindles extends in three dimensions. The arrangement of the fibrous composite spindles may be unstructured, having no observable pattern or ordered building block that forms the open lattice structure. Alternatively, the arrangement of the spindles may be structured, having an identifiable pattern or building block that forms the open lattice structure. For example, in one embodiment, the spindles may be organized into a plurality of panels (i.e., a panel is a building block of the open lattice structure). More specifically, in an exemplary embodiment, the web structure may include a plurality of first open lattice panels and a plurality of second open lattice panels, wherein the plurality of first panels intersects the plurality of second panels at multiple nodes to define the three-dimensional open lattice structure. In an exemplary embodiment, the plurality of first and second panels may be arranged to be substantially perpendicular to each other.

In one embodiment, each of the plurality of first panels defines a first extension direction and may include a plurality of spindles that are arranged generally non-perpendicular to the first extension direction in criss-cross fashion (e.g., cross spindles). Additionally, each of the plurality of first panels may include spindles that are generally arranged perpendicular to the first extension direction (e.g., normal spindles). A distribution of spindles may be non-uniform in the first extension direction and be based on a load condition of the shear web. For example, both distributions of normal spindles and cross spindles may be non-uniform in the first extension direction and may be based on a load condition of the shear web. More specifically, in the first extension direction, a density of spindles (e.g., cross spindles and/or normal spindles) in high load regions of the shear web may be greater than the density of spindles in low load regions of the shear web.

Further to this embodiment, each of the plurality of second panels defines a second extension direction and includes a plurality of spindles that are arranged generally non-perpendicular to the second extension direction in criss-cross fashion (e.g., cross spindles). Additionally, each of the plurality of second panels may also include a plurality of spindles that are arranged generally perpendicular to the second extension direction (e.g., normal spindles). A distribution of spindles in each of the plurality of second panels may be substantially uniform in the second extension direction and may be based on providing a more uniform load across the shear web, for example. More specifically, in the second extension direction a density of spindles may be substantially uniform.

In one embodiment, the plurality of second panels may be non-uniformly distributed in the first extension direction and may be based on a load condition of the shear web, for example. More specifically, in the first extension direction, a density of second panels in high load regions of the shear web may be greater than the density of second panels in low load regions of the shear web.

In another embodiment, at least one of the lower and upper flanges includes an open lattice panel oriented to extend in the first extension direction. In this embodiment, the open lattice panel forming the at least one of the lower and upper flanges includes a plurality of spindles (e.g., cross spindles and/or normal spindles) arranged relative to the first extension direction. A distribution of spindles in the panels may be non-uniform in the first extension direction and be based on a load condition of the shear web. More specifically, in the first extension direction, a density of spindles in high load regions of the shear web may be greater than the density of spindles in low load regions of the shear web.

In another embodiment, an end of the lower and upper flanges of the shear web which is configured to be located adjacent a root end of the wind turbine blade may include an extension tab. In one embodiment, the extension tab may include a widened portion configured to increase a bonding surface area of the shear web. Moreover, at a transition region adjacent the end of the shear web, the spindles extending from the lower and upper flanges may have a swept or scalloped configuration. These features in the end of the shear web at the root end of the blade are configured to reduce peel loads between the shear web and the outer shell of the wind turbine blade.

In a further aspect of the invention, the shear web may have a hybrid construction with some aspects of the shear web having a conventional construction and other aspects of the shear web having an open lattice construction formed by a continuous fiber-reinforced additive manufacturing process. By way of example, in one embodiment, the web structure may have a laminate composite construction, the lower and upper flanges may have a laminate composite construction or pultruded construction, and the open lattice structure may be formed on at least one surface of the lower flange, upper flange, and the web structure. In an exemplary embodiment, the web structure may include first and second opposed surfaces, and the open lattice structure may be formed on each surface of the web structure. In another embodiment, each of the lower and upper flanges may include an outer surface, and the open lattice structure may be formed on the outer surface of each of the lower and upper flanges.

In a further embodiment, a wind turbine blade having a shear web as described above is disclosed. In one embodiment, the wind turbine blade may have a sectional blade design and include a first blade section and a second blade section configured to be joined at a connection interface. The first and second blade sections include a first shear web portion and a second shear web portion, respectively, wherein at least the web structure of the first shear web portion and the web structure of the second shear web portion are configured to connect with each other in a nesting relationship when the first and second blade sections are joined together. The arrangement of the fibrous composite spindles in the web structure of the first shear web portion and the arrangement of the spindles in the web structure of the second shear web portion are such that spindles of the shear web are substantially aligned across the connection interface when the blade sections are joined. This arrangement provides continuous lines of force between the lower and upper flanges across the connection joint. A wind turbine having a wind turbine blade as described above is also disclosed.

In yet another embodiment, a method of making a shear web for a wind turbine blade is disclosed. The method includes providing a lower flange; providing an upper flange; providing a web structure configured to extend between the lower and upper flanges; forming at least one of the lower flange, upper flange, and web structure web structure with an open lattice structure having a plurality of elongate fibrous composite spindles intersecting each other at multiple nodes of the open lattice structure; connecting the lower flange to a lower end of the web structure; and connecting the upper flange to an upper end of the web structure. The open lattice structure is formed by a continuous fiber-reinforced additive manufacturing process.

In one embodiment, the forming step further includes forming the web structure as a three-dimensional open lattice structure having a plurality of fibrous elongate composite spindles extending in three dimensions. For example, in an exemplary embodiment, forming the web structure as a three-dimensional open lattice structure further includes forming a plurality of first open lattice panels; forming a plurality of second open lattice panels; orienting the plurality of first open lattice panels; and orienting the plurality of second open lattice panels such the plurality of first panels intersects the plurality of second panels at multiple nodes to define the three-dimensional open lattice structure.

In one embodiment, forming the plurality of first panels may further include, for each of the plurality of first panels, forming a plurality of spindles arranged generally non-perpendicular to the first extension direction in criss-cross fashion (e.g., cross spindles). The method may also include, for each of the plurality of first panels, forming a plurality of spindles arranged generally perpendicular to the first extension direction (e.g., normal spindles). In an exemplary embodiment, the method may include non-uniformly distributing the spindles in the first extension direction based on a load condition of the shear web, for example. More specifically, the method may include, in the first extension direction, providing a density of spindles in high load regions of the shear web greater than the density of the spindles in low load regions of the shear web.

In a further embodiment, forming the plurality of second panels may further include, for each of the second plurality of panels, forming a plurality of spindles arranged generally non-perpendicular to the second extension direction in cross-cross fashion (e.g., cross spindles). The method may also include, for each of the plurality of second panels, forming a plurality of spindles arranged generally perpendicular to the first extension direction (e.g., normal spindles). In an exemplary embodiment, the method may include substantially uniformly distributing the spindles in the second extension direction to more uniformly distribute forces across the shear web, for example. More specifically, the method may include in the second extension direction, providing a density of spindles in high load regions of the shear web greater than the density of spindles in low load regions of the shear web.

In another embodiment, the method may include substantially uniformly distributing the plurality of first panels in the second extension direction. More specifically, the method may include, in the second extension direction, providing a substantially uniform density of the plurality of first panels.

In a further embodiment, providing the lower flange and the upper flange may further include, for each flange, forming an open lattice panel and orienting the panel in the first extension direction, wherein the open lattice panels that form the lower and upper flanges are formed by a continuous fiber-reinforced additive manufacturing process.

In one embodiment, forming the panels for the lower and upper flanges may further include, for each of the panels, forming a plurality of spindles relative to the first extension direction (e.g., cross spindles and/or normal spindles). In one embodiment, the method includes non-uniformly distributing the spindles in the first extension direction based on a load condition of the shear web, for example. More specifically, the method may include, in the first extension direction, providing a density of spindles in high load regions of the shear web greater than the density of the spindles in low load regions of the shear web.

In a further embodiment, providing the lower and upper flanges further includes forming an extension tab on each of the lower and upper flanges. In one embodiment, forming the extension tab includes forming the extension tab with a widened portion to increase the bonding surface area. In a further embodiment, the method may include arranging the spindles extending from the lower and upper flanges in a scalloped configuration adjacent the end of the lower and upper flanges including the extension tab.

In still a further embodiment, the method may include forming the lower and upper flanges from a laminate composite construction or a pultruded construction; forming the web structure from a laminate composite construction; and forming the open lattice structure on at least one surface of the lower flange, upper flange, and the web structure.

For example, in one embodiment, the method may include forming the open lattice structure on opposed first and second surfaces of the web structure. Additionally or alternatively, the method may include forming the open lattice structure on an outer surface of each of the lower and upper flanges.

In yet another embodiment, a method of making a wind turbine blade includes forming a first blade half; forming a second blade half; forming a shear web according to the method described above; connecting the shear web to the first blade half; connecting the second blade half to the first blade half; and connecting the shear web to the second blade half. The connection of the shear web to the first and second blade halves and the connection of the first and second blade halves to each other may be done simultaneously or in multiple steps.

In one embodiment, the first and second blade halves may further include moulding each of the first and second blade halves. Additionally, the method may include forming the wind turbine blade as a first blade section and a second blade section configured to be joined at a connection interface. The first and second blade sections include a first shear web portion and a second shear web portion, respectively, and at least the web structure of the first shear web portion and the web structure of the second shear web portion are configured to connect with each other in a nesting relationship. The method further includes connecting the first blade section and the second blade section together at the connecting interface such that the arrangement of the spindles in the web structure of the first shear web portion and the arrangement of the spindles in the web structure of the second shear web portion are substantially aligned across the connecting interface.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
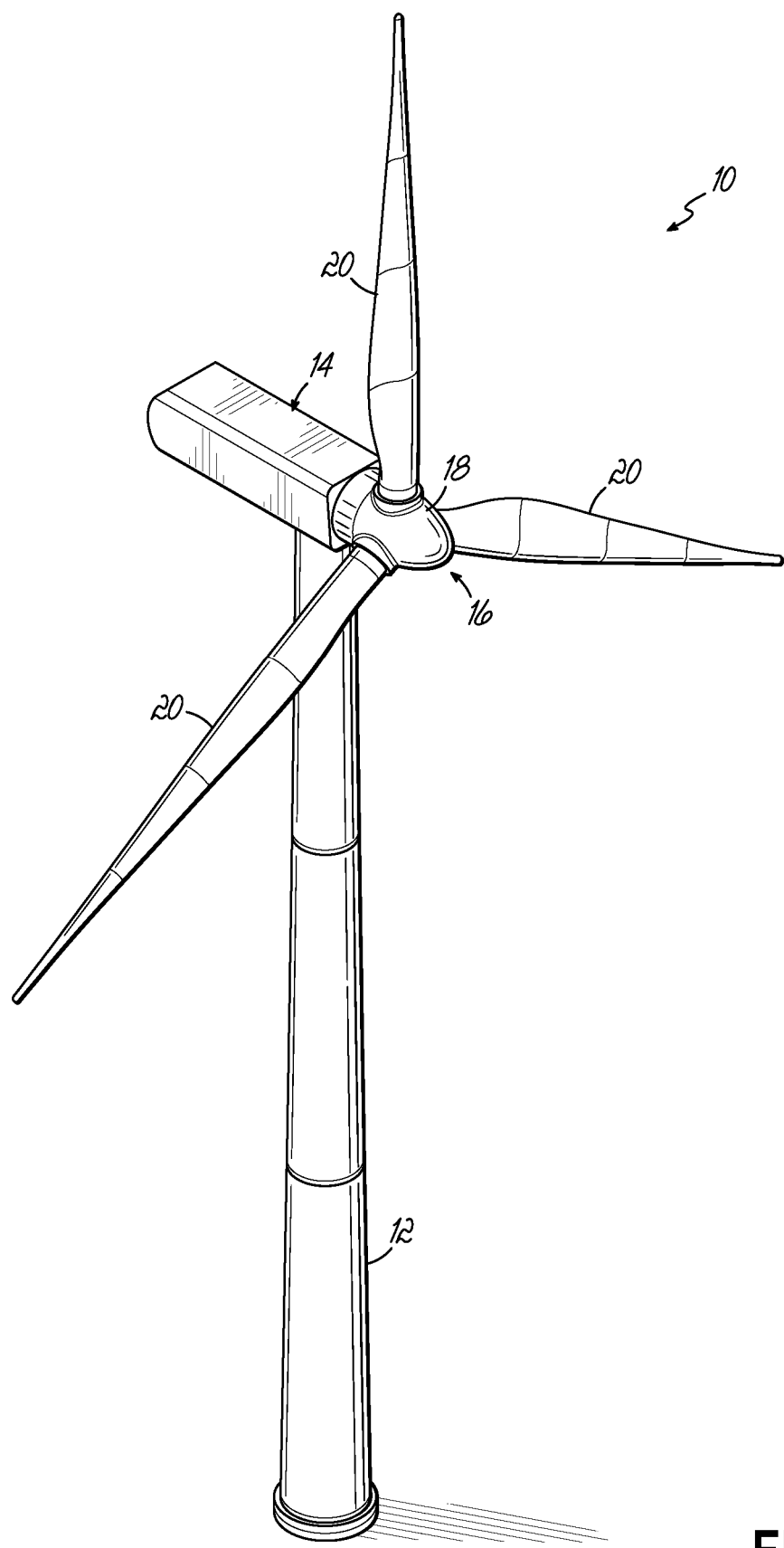
FIG. 1 is a front perspective view of a wind turbine having a wind turbine blade in accordance with an embodiment of the invention.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of wind turbine 10 includes a central hub 18 and at least one blade 20 that projects outwardly from the central hub 18 at locations circumferentially distributed thereabout. In the representative embodiment, the rotor 16 includes three blades 20, but the number may vary. The blades 20 are configured to interact with the passing air flow to produce lift that causes the central hub 18 to spin about a longitudinal axis.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

The wind turbine blade 20 may generally be of an improved design, and in an exemplary embodiment be configured as an elongate structure having an outer airfoil shell 22 disposed about an inner support element or spar structure 24 disposed inside the outer shell 22. The outer shell 22 may be optimally shaped to give the blade 20 the desired aerodynamic properties to generate lift, while the spar structure 24 is configured to provide the structural aspects (e.g., strength, stiffness, etc.) to blade 20. The elongate blade 20 includes a root end 26 which is configured to be coupled to the central hub 18 when mounted to rotor 16, and a tip end 28 longitudinally opposite to root end 26. In the orientation shown in FIG. 2, the outer shell 22 may include a windward shell half 30 that defines the lower side of the blade 20, and a leeward shell half 32 that defines the upper side of the blade 20. The windward and leeward shell halves 30, 32 are coupled together along a leading edge 34 and a trailing edge 36 located opposite one another across a chord of the blade 20.

Figure 3:
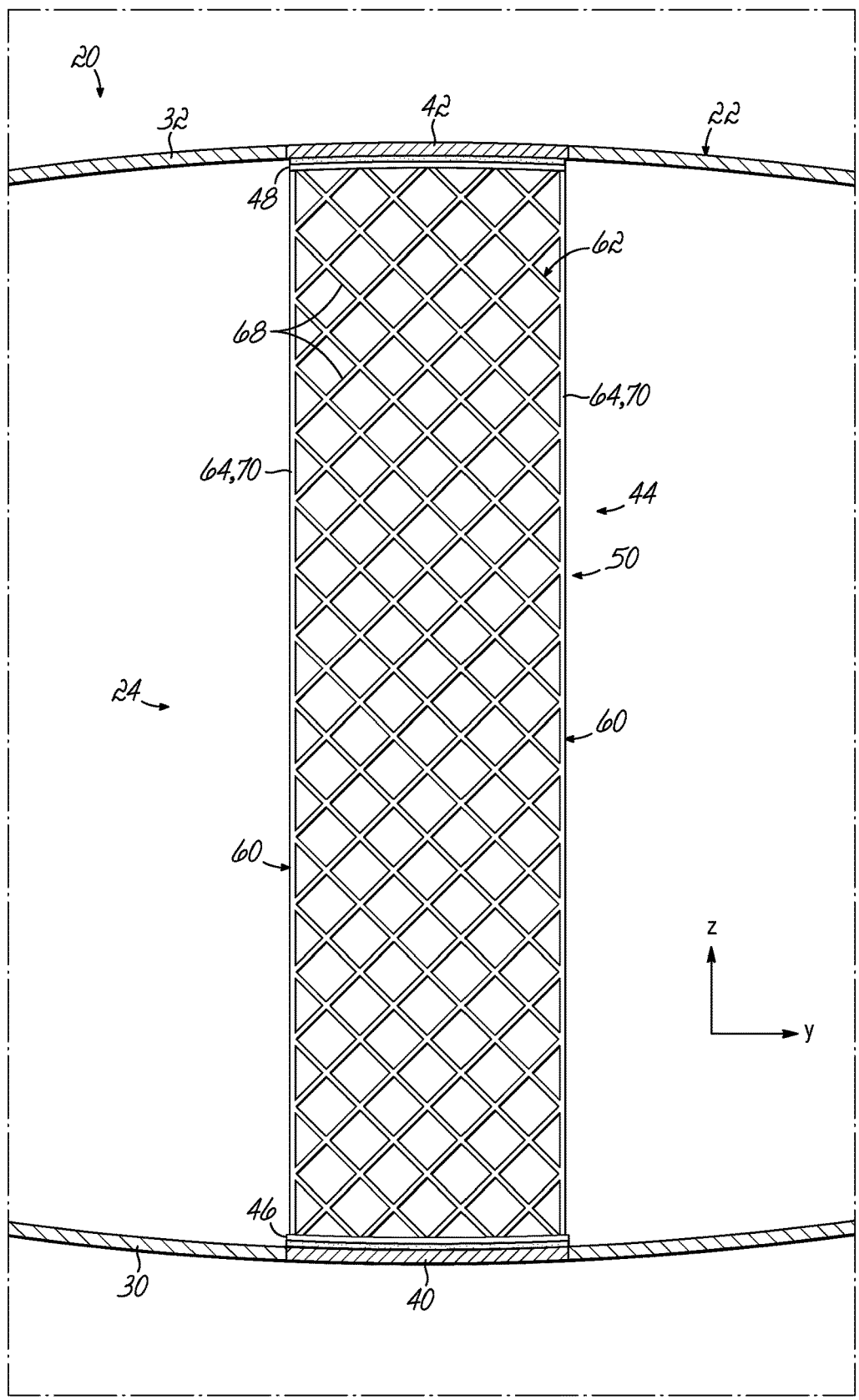
FIG. 3 is a cross-sectional view of the wind turbine blade of FIG. 2 illustrating a spar structure in accordance with an embodiment of the invention.

As best illustrated in FIG. 3, to increase strength and rigidity, the blade 20 may include a spar structure 24 that extends longitudinally along at least a portion of the length of the blade 20 between the root end 26 and the tip end 28. The spar structure 24 may extend, for example, a majority of the length of the wind turbine blade 20 between the root end 26 and the tip end 28 (e.g., greater than 80% or 90% of the length of the blade 20). In an exemplary embodiment, the spar structure 24 includes a pair of spar caps 40, 42 associated with respective windward and leeward shell halves 30, 32 and a shear web 44 that extends between the opposed spar caps 40, 42. The spar caps 40, 42 are generally designed to carry bending loads on the blade 20 and the shear web 44 is designed to generally carry the shear loads on the blade 20. In one embodiment, the spar caps 40, 42 may be integrated within the windward and leeward shell halves 30, 32 such that the spar caps 40, 42 form part of the outer airfoil shell 22. Such an arrangement is illustrated in FIG. 3, for example. In an alternative embodiment (not shown), however, the spar caps 40, 42 may be separate elements adhesively bonded to an inner surface of the outer shell 22. In one embodiment, the spar caps 40, 42 may be formed from a stack of pultruded fiber-reinforced composite strips. In an alternative embodiment, however, the spar caps 40, 42 may have a laminate composite construction of a plurality of fiber layers, resin, and possibly core material.

The shear web 44 extends across the height of the blade 20 from the windward shell half 30 to the leeward shell half 32 and between the spar caps 40, 42. In an exemplary embodiment, the shear web 44 includes a lower flange 46, an upper flange 48, and an intermediate web structure 50 extending between the lower and upper flanges 46, 48. As illustrated in FIG. 3, the lower and upper flanges 46, 48 of the shear web 44 are configured to be adhesively bonded to the inner surfaces of the spar caps 40, 42, respectively. In the embodiment illustrated in FIG. 3, for example, the lower and upper flanges 46, 48 may have a laminate composite construction of a plurality of fiber layers, resin, and possibly core material which are, in turn, adhesively bonded to the web structure 50. As described in more detail below, aspects of the invention are primarily directed to details of the intermediate web structure 50 of the shear web 44. Other aspects of the invention are directed to details of the flanges 46, 48 of the shear web 44. Each will be described in detail below.

In this regard, aspects of the invention are directed to the intermediate web structure having a three-dimensional open lattice construction of fibrous composite material. The three-dimensional open lattice construction includes a plurality of elongate structural members made of fibrous composite material extending in three dimensions and intersecting each other to form a web-like network of interconnected, rod-like spindles that collectively form the web structure. Thus, for a given volume of the web structure (e.g., 1 m$^3$), some fraction of the volume will be occupied by fibrous composite material and the remaining fraction of the volume will be void. Accordingly, the web structure in accordance with aspects of the invention does not have a solid-body construction, like moulded web structures of conventional shear webs, but includes a lattice arrangement with void space. The concept embodied in the three-dimensional open lattice construction is that the load-bearing capacity of the web structure may be significantly increased, such as by arrangement of the spindles in three dimensions, while minimizing the overall weight of the web structure by having considerable void space. In other words, the three-dimensional open lattice construction of the web structure provides a strength-to-weight ratio that exceeds, and in many cases far exceeds, the strength-to-weight ratio of solid composite web structures produced by conventional moulding processes, as described above. This is important as the size of the wind turbine blades continue to grow.

The three-dimensional open lattice construction of the web structure not only provides for increased strength at lower weights, but also provides increased design flexibility through localized arrangements of the spindles based on estimated local load conditions on the web structure (and wind turbine blade). Thus, through the arrangement of the spindles (i.e., elongate members made of fibrous composite material), the web structure may be configured to have high strength in localized regions subjected to high load conditions and reduced strength in localized regions subjected to lower load conditions. In general, this approach dispenses with the less refined, more global approach of conventional moulding operations, and instead provides for a more tailored, detailed approach for providing material and weight where strength is needed and reducing material and weight where strength is not needed. In other words, in expected regions of high load, the web structure may include a greater number of spindles per unit volume (and therefore mass per unit volume), and in expected regions of low load, the web structure may include fewer spindles per unit volume. The spindle distribution (and therefore the strength distribution) of the web structure may be characterized through the concept of density, i.e., the amount of mass of fibrous composite material of the spindles per unit volume of the web structure.

In addition to the above, the three-dimensional open lattice construction of the web structure allows the shear web to be designed in a manner that provides for a more uniform load distribution across the flanges of the shear web and across the bond area between the flanges and the spar caps. Moreover, due to the more uniform load distribution, the peak loads across the flanges and bond area are reduced, thereby reducing the likelihood of a failure in the bonded joint. The ability to strengthen the bond area and decrease the peak loads is also important as the size of the wind turbine blades continue to grow.

To achieve the three-dimensional open lattice construction of the web structure, and the benefits it provides to wind turbine blade manufacturing, the conventional moulding process is partially or wholly abandoned for a more adaptive additive manufacturing (AM) process, such as 3-D printing technologies. In many industrial applications, additive manufacturing processes using polymer-based resins were used to produce prototype parts in the early stages of product development rather than functional parts. This limitation was based primarily on the fact that parts formed from polymer-based resins lacked the necessary mechanical properties required by functional parts during field conditions. More recently, to improve the mechanical properties of parts made by additive manufacturing, fiber strands (e.g., short fibers) have been introduced into the resin matrix within or just outside of the print head of the 3-D printer and then printed together to form a part. While the introduction of short fibers into the matrix increases the strength of the 3-D printed part, it is believed that the strength of such composite parts is less than the traditional mould-based fiber-reinforced composites. Thus, to further increase the mechanical properties of 3-D printed parts, continuous fiber-reinforced additive manufacturing methods have been developed.

Continuous fiber-reinforced additive manufacturing methods integrate a continuous fiber with a resin matrix in the 3-D printing process and may take several forms, including in-situ impregnation, co-extrusion with towpreg, towpreg extrusion, in-situ consolidation, inline impregnation, and possibly others. The essence of these methods is that a continuous fiber or continuous group of fibers is mixed with a resin matrix within a print head or just outside of a print head of a 3-D printer and the fiber(s) and matrix dispensed from the print head to form a part. The inclusion of the continuous fiber within the resin matrix increases the mechanical properties (e.g., strength) of the composite part such that the 3-D printed part may now operate as a functional part during use. Systems that provide continuous fiber-reinforced additive manufacturing are commercially available. By way of example and without limitation, Continuous Composites of Coeur d'Alene, Idaho; Electroimpact of Mukilteo, Washington; Ingersoll Machine Tools of Rockford Illinois; Markforged of Watertown, Massachusetts; moi composites of Milan, Italy; and Orbital Composites of San Jose, California provide commercially available continuous fiber additive manufacturing services.

Continuous fiber-reinforced additive manufacturing provides free-form geometry generation capable of complex and specifically tailored designs based on various design criteria, such as strength, material and weight considerations, to optimize performance. Additionally, such additive manufacturing processes provide the ability to change design configurations without the need to modify or replace tooling. Thus, the use of 3-D additive manufacturing processes to produce functional composite structures releases wind turbine designers and manufacturers from the constraints of conventional moulding processes. This vastly increases the design options for making wind turbine components, including shear webs for wind turbine blades, having improved performance and features. Continuous fiber-reinforced additive manufacturing methods are known and commercially available. Accordingly, a detailed discussion of such devices and processes will not be described in detail herein. Aspects of the invention are directed more to the use of these additive manufacturing processes in the production of wind turbine blade components, such as a shear web for a wind turbine blade.

One embodiment of the invention is directed to the shear web, and more particularly to the intermediate web structure thereof having a three-dimensional open lattice construction formed by fibrous composite spindles extending in three dimensions. The three-dimensional nature of the spindles may be unstructured, having seemingly random orientations of the spindles to form the three-dimensional lattice construction. Alternatively, the three-dimensional nature of the spindles may be structured, wherein there is an identifiable arrangement of spindles that form, for example, a latticed building block. The intermediate web structure may then be formed by an arrangement of multiple latticed building blocks connected to each other to provide the three-dimensional open lattice construction. By way of example, and without limitation, the latticed building block may include various polyhedrons or other three-dimensional geometrical shapes.

As will be discussed in more detail below, in an exemplary embodiment, the three-dimensional open lattice construction may be formed by an arrangement of panels formed from fibrous composite spindles. In other words, a panel is a building block formed by spindles, and the intermediate web structure may be formed by an arrangement of multiple panels to form the three-dimensional open lattice structure (e.g., consider two nonparallel panels intersecting each other at an angle to form the three-dimensional open lattice structure). In an exemplary embodiment, a panel may be box shaped or plate like (e.g., a rectangular prism) that generally defines a primary plane in a first dimension and a second dimension, and has a reduced extent in a third dimension to provide the plate-like configuration of the panel. One can easily imagine, for example, a panel having a length and height (that defines an infinitesimally thin plane) and a width that is significantly less than the length and height to define the plate-like panel. The fibrous composite spindles that form the panel extend within the primary plane of the panel but also have an inherent "width" (e.g., the diameter of the spindles) that generally defines the reduced third dimension of the panel. Thus, the spindles are contained within the volume of the rectangular prism of the panel. The panel is substantially two dimensional but does include a small third dimension due the spindles having a "width" to them. In any event, the concept of a panel being planar or defining a plane accounts for there be an inherent width to the spindles that form the panel. The spindles may extend in various directions within the primary plane and intersect with each other at nodes to form the latticed panels.

In an exemplary embodiment, the three-dimensional open lattice construction of, for example, the intermediate web structure, may be formed by a plurality of the panels arranged in intersecting fashion. In this regard, select pairs of panels of the three-dimensional open lattice structure may intersect each other in a wide range of angles. For example, in one embodiment, pairs of panels may be arranged to be substantially perpendicular to each other. In another embodiment, however, pairs of panels may intersect each other at an angle greater to or less than about ninety degrees, and all of the panels may or may not intersect each other at the same angle. Thus, it should be understood that a plurality of panels may be arranged in a wide range of configurations to form the three-dimensional open lattice construction of the intermediate web structure and should not be limited to that shown and described herein.

Figure 4:
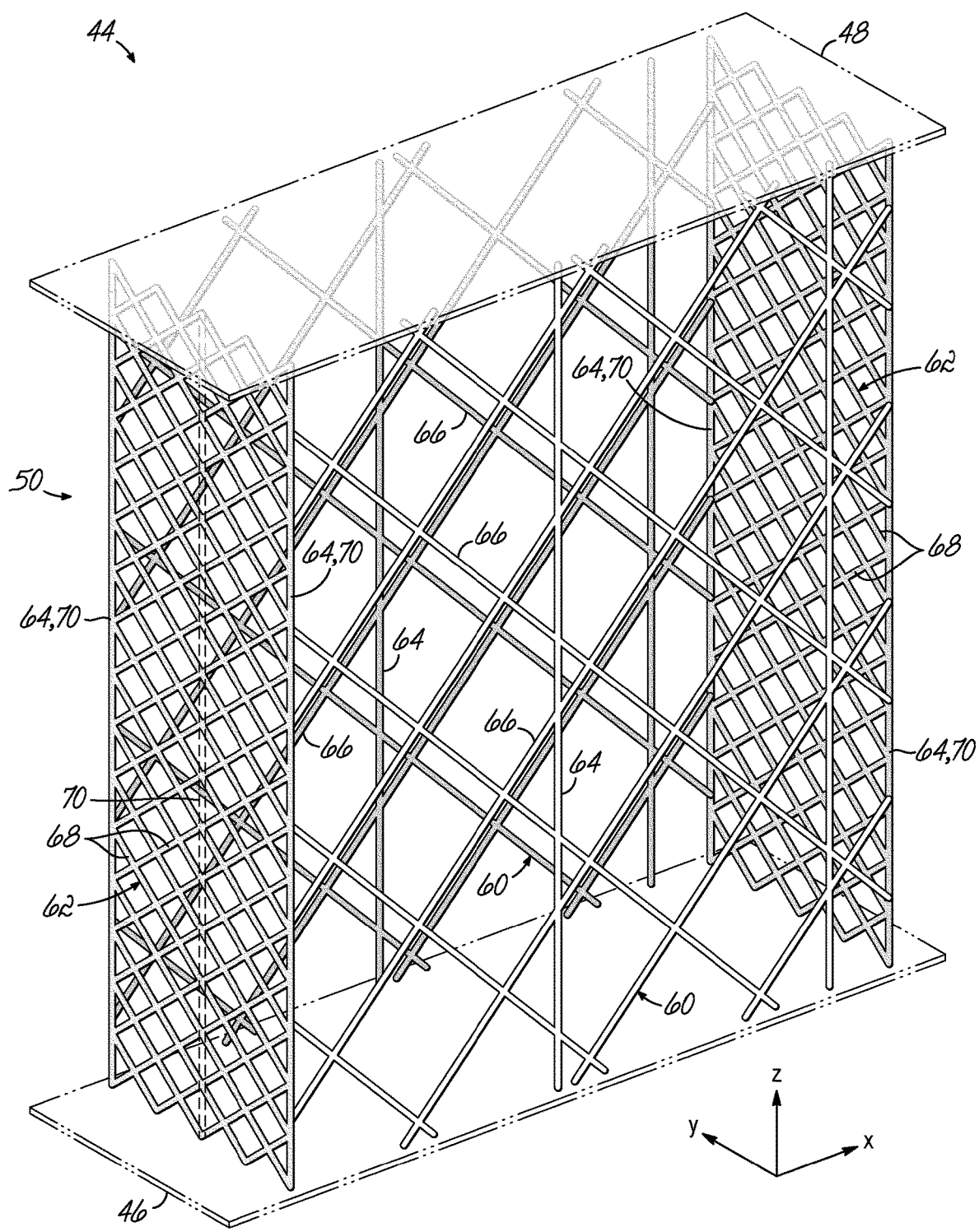
FIG. 4 is a partial perspective view of the shear web illustrated in FIG. 3 in accordance with an embodiment of the invention.

FIG. 4 illustrates a shear web 44 in accordance with an exemplary embodiment of the invention. The shear web 44 includes lower and upper flanges 46, 48 and an intermediate web structure 50 produced by a continuous fiber-reinforced additive manufacturing process. Notably, the intermediate web structure 50 has a three-dimensional open lattice construction formed by fibrous composite spindles extending in three dimensions. Such a construction cannot be achieved by conventional manufacturing techniques, including conventional moulding processes. More particularly, the web structure 50 includes a plurality of first open lattice panels 60 and a plurality of second open lattice panels 62 that intersect each other to form the three-dimensional construction. Each of the open lattice panels 60, 62 may be formed by fibrous composite spindles which extend in various directions within the primary plane defined by the panels. In one embodiment, and as shown in FIG. 4, the plurality of first panels 60 and the plurality of second panels 62 may be arranged substantially perpendicular to each other (e.g., intersect at 90+/−5 degrees) to give the web structure 50 a box-like configuration. It should be understood, however, that the open lattice panels 60, 62 may intersect each other at other angles and remain within the scope of the present invention.

As illustrated in FIGS. 2-4 and 6, wind turbine blade 20 may be described as having a spanwise direction x generally defined by, i.e. extending between, the root end 26 and tip end 28 of the blade 20; a chordwise direction y generally defined by, i.e. extending between, the leading edge 34 and trailing edge 36, and a thickness wise direction z generally defined by, i.e. extending between, the windward shell half 30 and the leeward shell half 32. The lower and upper flanges 46, 48 have a plate-like configuration and generally include a primary plane extending in the spanwise direction x and the chordwise direction y, and a significantly smaller extent in the thickness wise direction z. Though being plate-like in configuration, the lower and upper flanges 46, 48 are generally thought of as extending along the length of the blade 20 in the spanwise direction (referred to as the extension direction for the flanges 46, 48).

The open lattice panels 60, 62 of the intermediate web structure 50 may be arranged relative to the spanwise, chordwise, and thickness wise directions of the wind turbine blade 20. For example, in an exemplary embodiment, the first panels 60 may be arranged such that the primary plane of the panels extends in the spanwise direction and the thickness wise direction, and the significantly smaller extent of the panels 60 extends in the chordwise direction (e.g., see FIGS. 4 and 6). Accordingly, these open lattice panels 60 may be referred to herein as spanwise panels and may be thought of as generally extending along the length of the blade 20 in the spanwise direction (the extension direction of panels 60). Moreover, in this exemplary embodiment, the second panels 62 may be arranged such that the primary plane of the panels extends in the chordwise direction and the thickness wise direction, and the significantly smaller extent of the panels 62 extends in the spanwise direction (e.g., see FIGS. 3 and 4). Accordingly, these open-lattice panels 62 may be referred to herein as chordwise panels and may be thought of as generally extending along the width of the blade 20 in the chordwise direction (the extension direction of panels 62). It should be recognized, however, that the three-dimensional arrangement of the web structure 50 is not limited to this orientation or arrangement of the open lattice panels 60, 62 relative to the spanwise, chordwise, and thickness wise directions of the blade 20. Moreover, while the web structure 50 is illustrated as having two spanwise panels 60, this is merely illustrative as the web structure 50 may have more than two spanwise panels 60 extending along the length of the blade 20, as will be discussed in more detail below. Furthermore, the number of chordwise panels 62 and their respective positions along the length of the blade 20 may also vary, as will also be discussed in more detail below.

Each of the spanwise panels 60 includes a plurality of fibrous composite spindles in different orientations that intersect with each other at multiple nodes within the primary plane generally defined by the spanwise panels 60. In an exemplary embodiment, however, the spindles in the spanwise panels 60 may be arranged relative to the spanwise direction of the panels 60 (i.e., the extension direction of the panels). For example, the fibrous composite spindles of the spanwise panels 60 may include normal spindles 64 and cross spindles 66 relative to the spanwise direction of the spanwise panels 60. In an exemplary embodiment, the normal spindles 64 may be substantially perpendicular to the spanwise direction and the cross spindles 66 may be arranged at +/−45 degrees relative to the spanwise direction of the spanwise panels 60 in a criss-cross fashion. However, other uniform and/or non-uniform angles of the cross spindles 66 may also be possible in alternative embodiments. In one embodiment, the spanwise panels 60 may include only or primarily cross spindles 66. In an alternative embodiment, however, the spanwise panels 60 may include a combination of cross spindles 66 and normal spindles 64. In one embodiment, the distribution of the normal spindles 64 in the spanwise direction of the spanwise panels 60 may vary depending on various factors, including an expected localized load condition on the blade 20, and more specifically the shear web 44. By way of example, the position of the normal spindles 64 in the spanwise direction of the spanwise panels 60 may be determined based on the brazier loading of the shear web 44.

Figure 5:
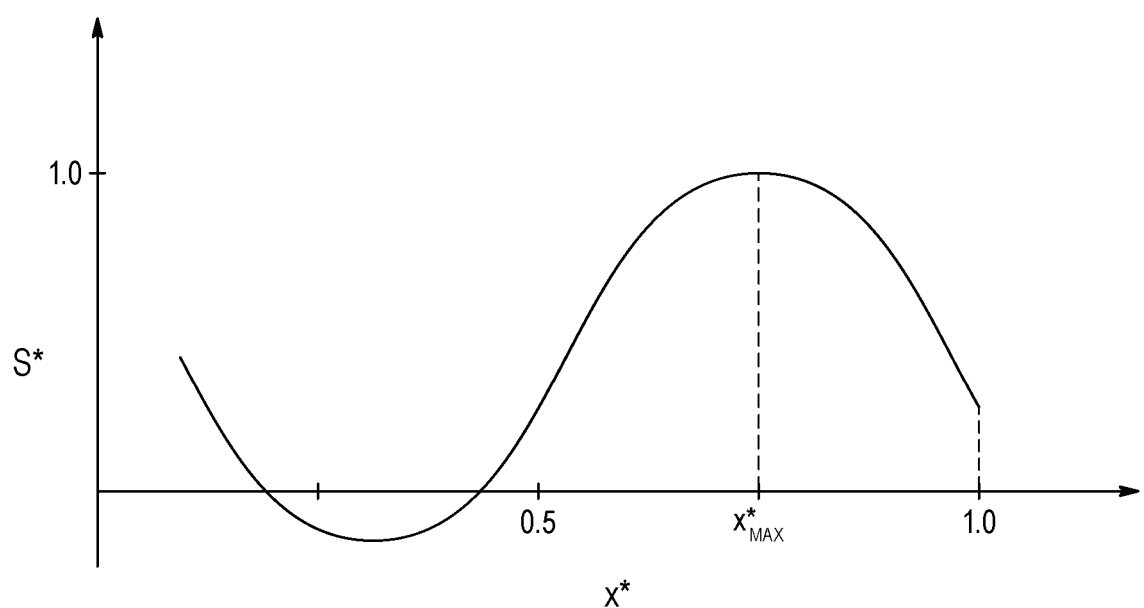
FIG. 5 is a schematic characteristic load condition on a web structure of a shear web in a spanwise direction of the blade.

FIG. 5 is a schematic illustration of a characteristic load condition on the shear web 44 in the spanwise direction during use of the wind turbine blade 20. In this figure, the x coordinate represents the spanwise direction of the shear web 44; L is the length of the shear web 44; S is the localized load on the shear web 44 as a function of distance x in the spanwise direction; $x^*$ is a normalized x coordinate based on the length of the shear web 44 (i.e., $x^*=x/L$); and $S^*$ is a normalized load based on the maximum load experienced by the shear web 44 in the spanwise direction (i.e., $S^*=S(x)/S_{max}$). As illustrated in FIG. 5, the location of maximum load $x^*_{Max}$ in the shear web 44 generally occurs in the outer half of the shear web 44, i.e., $x^*_{Max}>0.5$. More particularly, and by way of example, the location of maximum load may be between $0.6 \leq x^*_{Max} \leq 0.8$ depending on the particular wind turbine blade 20. The trend illustrated by FIG. 5 is that the load is relatively low at the root end 26 (and may even change directions adjacent the root end 26), increases toward the mid-blade region, and continues to increase until the maximum load is reached in the outer region of the blade 20. From the point of maximum load, the load then decreases in the direction of the tip end 28 of the blade 20.

Figure 6:
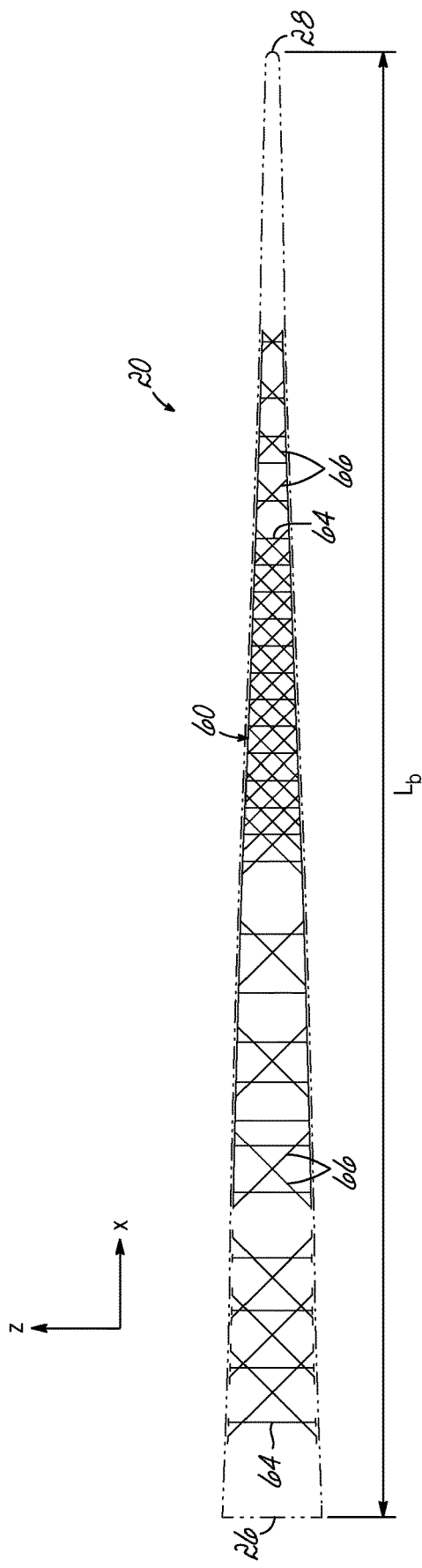
FIG. 6 is a side plan view of the web structure of the wind turbine blade illustrating spindles of a spanwise panel of the web structure.

In general, and in accordance with an aspect of the invention, there will be more normal spindles 64 in high load regions of the shear web 44 and fewer normal spindles 64 in lower load regions of the shear web 44. Thus, adjacent normal spindles 64 will be more closely spaced from each other in high load regions of the shear web 44 and further spaced from each other in lower load regions of the shear web 44. FIG. 6 is a schematic illustration of a spanwise panel 60 of the shear web 44 extending along the length $L_b$ of the wind turbine blade 20. As illustrated in this figure, the spacing between adjacent normal spindles 26 adjacent the root end 26 of the blade 20 may be relatively high. However, the relative spacing between adjacent normal spindles 64 starts decreasing in the spanwise direction toward the location of maximum load. Thereafter, the spacing between adjacent normal spindles 64 in the spanwise direction starts increasing again toward the tip end 28 of the blade 20.

Figure 7:
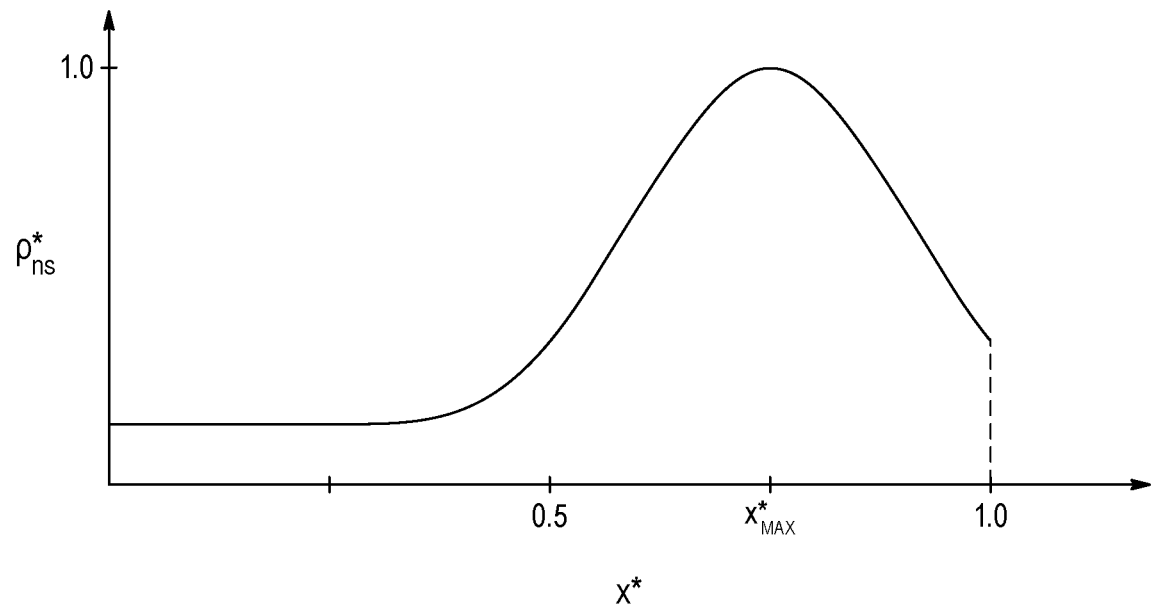
FIG. 7 is a schematic density distribution of normal spindles of the web structure in the spanwise direction based on expected load conditions.

FIG. 7 is a schematic illustration of a characteristic density distribution of normal spindles 64 in the spanwise direction of the shear web 44 in accordance with an aspect of the invention. In this figure, $\rho_{ns}$ is the localized density, i.e., the mass of fibrous composite material that forms the normal spindles 64 per unit volume of the spanwise panel 60 as a function of distance x in the spanwise direction of the shear web 44; and $\rho^*_{ns}$ is a normalized density based on the maximum density value along the spanwise panel 60 (i.e., $\rho^*_{ns}=\rho_{ns}/\rho_{Max,ns}$). As demonstrated in FIG. 7, in an exemplary embodiment, the distribution of normal spindles 64 in the spanwise direction of the shear web 44 may be such that the normalized density distribution of normal spindles 64 is a substantially stochastic distribution about the location of maximum load in the shear web 44 (i.e., with the maximum of the density distribution at $x^*_{Max}$). The distribution of normal spindles 64 in the spanwise panel 60 according to that illustrated in FIG. 7 is but one possible distribution based on the expected load conditions of the wind turbine blade 20, and shear web 44 more particularly. Accordingly, it should be recognized that other distributions that accommodate strength requirements based on expected load conditions are possible and remain within the scope of the present invention.

In one embodiment, the distribution of the cross spindles 66 in the spanwise direction of the spanwise panel 60 may also vary depending on an expected localized load condition on the shear web 44. By way of example, the position of the cross spindles 66 may be determined based on the shear loading of the shear web 44. For a characteristic load distribution on the shear web 44 as illustrated in FIG. 5, and in accordance with an aspect of the invention, adjacent cross spindles 66 will be more closely spaced from each other in high load regions of the shear web 44 and further spaced from each other in lower load regions of the shear web 44. Turning to FIG. 6 illustrating a spanwise panel 60 of the shear web 44 extending along the length $L_b$ of the wind turbine blade 20, the spacing between adjacent cross spindles 66 may be relatively high adjacent the root end 26 of the blade 20. However, the relative spacing between adjacent cross spindles 66 starts decreasing in a direction toward the location of maximum load. Thereafter, the spacing between adjacent cross spindles 66 starts increasing again toward the tip end 28 of the blade 20.

Figure 8:
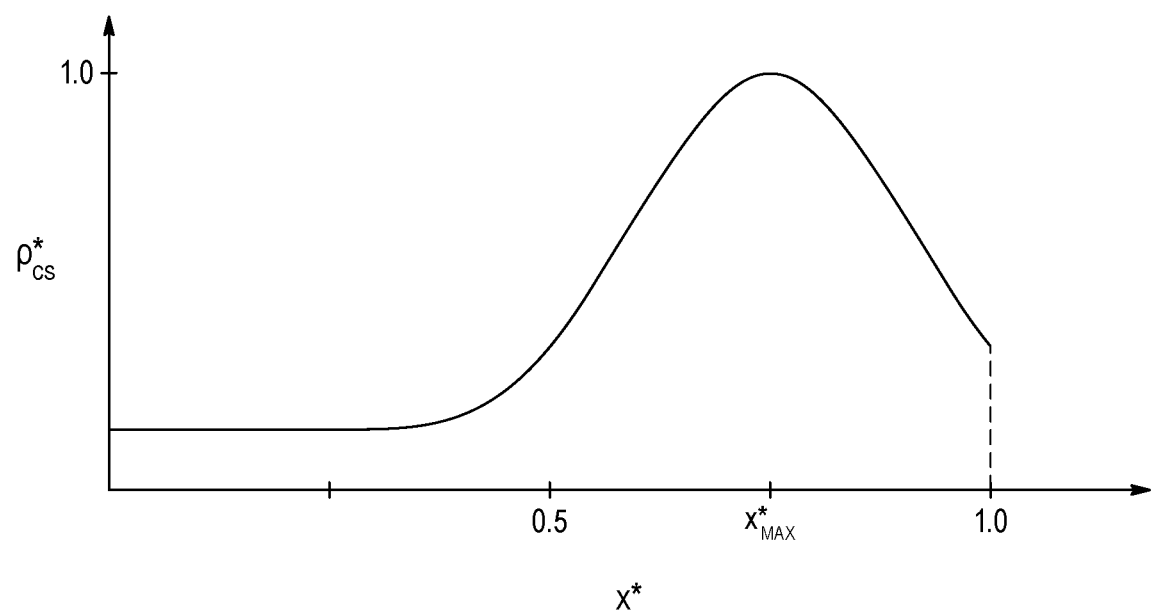
FIG. 8 is a schematic density distribution of cross spindles of the web structure in the spanwise direction based on expected load conditions.

FIG. 8 is a schematic illustration of a characteristic density distribution of cross spindles 66 along the length of the shear web 44 in accordance with an aspect of the invention. In this figure, $\rho_{cs}$ is the localized density, i.e., the mass of composite material that forms the cross spindles 66 per unit volume of the spanwise panel 60 as a function of distance x in the spanwise direction of the shear web 44; and $\rho^*_{cs}$ is a normalized density based on the maximum density value along the spanwise panel 60 (i.e., $\rho^*_{cs}=\rho_{cs}/\rho_{Max,cs}$). As demonstrated in FIG. 8, in an exemplary embodiment, the distribution of cross spindles 66 in the spanwise direction of the shear web 44 may be such that the normalized density distribution of cross spindles 66 may be a substantially stochastic distribution about the location of maximum shear load in the blade 20 (i.e., with the maximum of the distribution at $x^*_{Max}$). The distribution of cross spindles 66 in the spanwise panel 60 according to that illustrated in FIG. 8 is but one possible distribution based on the expected load conditions of the wind turbine blade 20 and the shear web 44 more particularly. Accordingly, it should be recognized that other distributions that accommodate strength requirements based on expected load conditions are possible and remain within the scope of the present invention.

Turning now to the chordwise panels 62, in a similar manner and in its broadest scope, each of these panels includes a plurality of fibrous composite spindles in different orientations that intersect with each other at multiple nodes within the primary plane generally defined by the chordwise panels 62. In an exemplary embodiment, the spindles in the chordwise panels 62 may be arranged relative to the chordwise direction of the panels 62. For example, the fibrous composite spindles of the chordwise panels 62 may include cross spindles 68 relative to the chordwise direction of the panels 62 (i.e., the extension direction of panels 62). In one embodiment, the cross spindles 68 may be arranged at +/−45 degrees relative to the chordwise direction of the panels 62. However, other uniform and/or non-uniform angles of the cross spindles 68 are also possible in alternative embodiments. The chordwise panels 62 may also include normal spindles 70 that are substantially perpendicular to the chordwise direction, depending on, for example, the extent of the chordwise panels 62 in the chordwise direction. In one embodiment, the normal spindles 64 of the spanwise panels 60 may also serve as the normal spindles 70 of the chordwise panels 62 (see FIG. 4). Aspects of the invention, however, are not so limited as the chordwise panels 62 may include normal spindles 70 that do not correspond to a normal spindle 64 in a spanwise panel 60. For example, FIG. 4 illustrates a chordwise panel 62 having a normal spindle 70 (shown in phantom) that does not correspond to a normal spindle 64 in a spanwise panel 60. In one embodiment, the chordwise panels 62 may include only or primarily cross spindles 68. In an alternative embodiment, however, the chordwise panels 62 may include a combination of cross spindles 68 and normal spindles 70. In one embodiment, the distribution of the spindles 68, 70 along the extent of the chordwise panel 62 may be based on several factors, including providing a more uniform load distribution across the width of the shear web 44 and bond region between the flanges 46, 48 and respective spar caps 40, 42.

Figure 9:
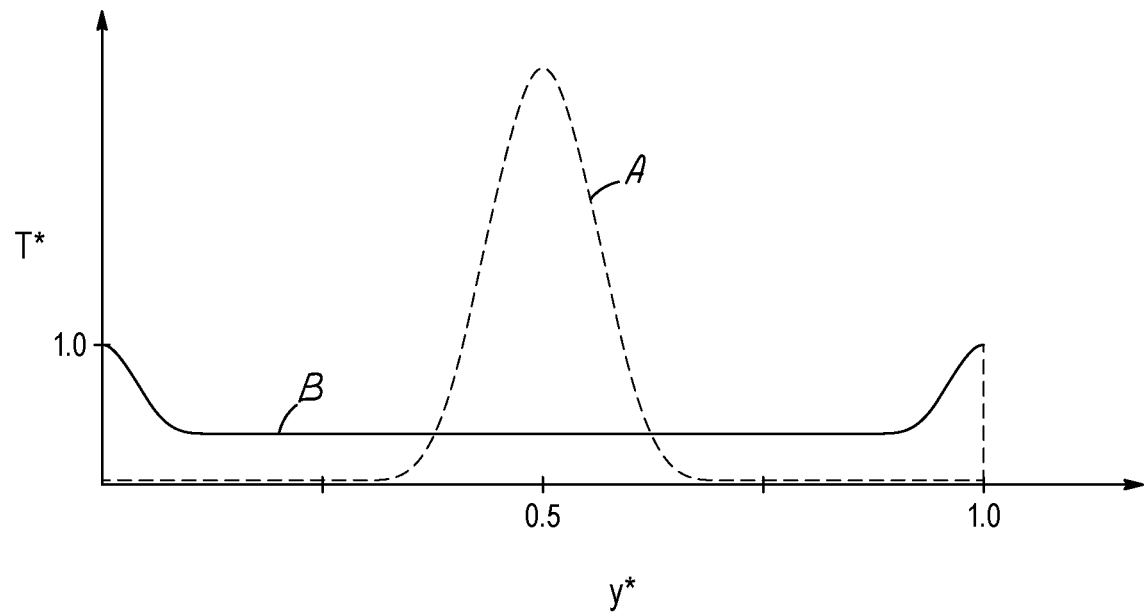
FIG. 9 is a schematic characteristic load condition on a web structure of a shear web in a chordwise direction of the blade.

FIG. 9 is a schematic illustration of a characteristic load condition on the shear web 44 in the chordwise direction during use of the wind turbine blade 20. In this figure, the y coordinate represents the chordwise direction of the wind turbine blade 20; W is the width of the shear web 44 in the chordwise direction; T is the localized load on the shear web 44 in the chordwise direction of the blade 20; y* is a normalized y coordinate based on the width of the blade 20 (i.e., y*=y/W); and T* is a normalized load based on the maximum load experienced by the shear web 44 in the chordwise direction (i.e., $T^*=T(y)/T_{max}$). Dashed curve A in FIG. 9 represents a schematic characteristic load condition on a conventional shear web having an I-shaped profile. As discussed above, the characteristic load condition has a maximum shear load near the central portion of the shear web (i.e., $y^*_{Max} \approx 0.5$), where the intermediate web is located, and the vast majority of the load is carried at a relatively small portion of the width of the shear web in the immediate vicinity of the intermediate web.

Curve B in FIG. 9 represents a schematic characteristic load condition in the shear web 44 as illustrated in FIG. 4, for example. As illustrated in FIG. 9, the location of maximum shear load in the shear web 44 generally occurs at the location of the spanwise panels 60, of which there are two in FIG. 4, i.e., at the leading-edge side and trailing-edge side of the web structure 50. The presence of the chordwise panels 62 facilitates the distribution of the loads at the spanwise panels 60 in the chordwise direction to provide a more uniform load distribution in the chordwise direction. Moreover, in an exemplary embodiment, the spanwise panels 60 of the web structure 50 are preferably located adjacent the edges of the flanges 46, 48 of the shear web 44 such that the web structure 50 extends across a majority of the width of the flanges 46, 48. For example, the web structure 50 may have a width greater than 70%, preferably greater than 80%, and even more preferably greater than about 90% of the width of the flanges 46, 48. The lower and upper flanges 46, 48 may, in turn, extend the majority of the width of the spar caps 40, 42, such as extending greater than 70%, preferably greater than 80%, and even more preferably greater than 90% of the width of the spar caps 40, 42. This arrangement not only increases the bond area between the spar caps 40, 42 and the flanges 46, 48 of the shear web 44 but also provides for for a more uniform distribution of the loads acting on the bond region.

The trend illustrated by FIG. 9 is that the shear load is relatively higher at the leading-edge and trailing-edge sides of the shear web 44 (due to the location of the spanwise panels 60) and decreases toward the mid-region of the shear web 44. Due to the chordwise panels 62, however, the amount of decrease in load away from the spanwise panels 60 is not significant and a portion of the load is distributed to and carried by those chordwise panels 62. As compared to the I-shaped shear web depicted in curve A, the peak load has been significantly reduced and the area over which the load is being distributed is significantly increased.

Figure 10:
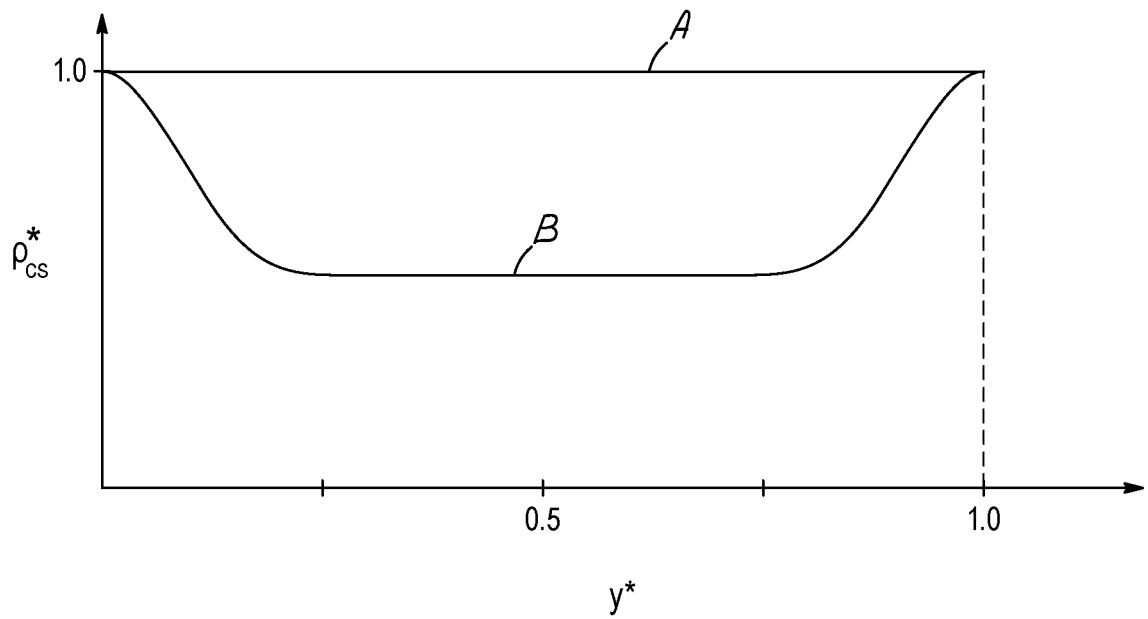
FIG. 10 is a schematic density distribution of cross spindles of the web structure in the chordwise direction.

In one embodiment, the distribution of cross spindles 68 in a chordwise panels 62 may be held relatively constant in that direction. FIG. 10 is a schematic illustration of a characteristic density distribution of cross spindles 68 in the chordwise direction y of a chordwise panel 62. In this figure, $\rho_{cs}$ is the localized density, i.e., the mass of composite material that forms the cross spindles 68 per unit volume of the chordwise panel 62 as a function of distance y in the chordwise direction; and $\rho^*_{cs}$ is a normalized density based on the maximum density value along the chordwise panel 62 (i.e., $\rho^*_{cs}=\rho_{cs}/\rho_{Max,cs}$). Curve A in FIG. 10 illustrates the embodiment where the cross spindles 68 are substantially uniform across the chordwise panel 62.

In an alternative embodiment, however, the distribution of cross spindles 68 in the chordwise panels 62 may vary depending on an expected localized load condition on the shear web 44. For a load distribution on the shear web 44 as illustrated as curve B in FIG. 9, there may be more cross spindles 68 in high load regions of the shear web 44 and fewer cross spindles 68 in lower load regions of the shear web 44. In other words, adjacent cross spindles 68 may be more closely spaced from each other in high load regions of the shear web 44 and further spaced from each other in lower load regions of the shear web 44. Thus, for example, the spacing between adjacent cross spindles 68 adjacent the leading-edge side and trailing-edge side of the chordwise panel 62 may be relatively lower. However, the spacing between adjacent cross spindles 68 may increase in a direction toward the mid-region of the shear web 44.

Curve B in FIG. 10 is a schematic illustration of a characteristic density distribution of cross spindles 68 in the chordwise direction of the web structure 50 in such an alternative embodiment. As demonstrated by this curve, in an exemplary embodiment, the distribution of cross spindles 68 in the chordwise panel 62 may be such that the normalized density distribution of cross spindles 68 is a maximum at the leading and trailing edge sides and decreases to a relatively constant level toward the mid-region. The distribution of cross spindles 68 in the chordwise panel 62 according to that illustrated in curves A and B of FIG. 10 are but two possible distributions. Thus, it should be recognized that other distributions based on uniformity in load, expected load conditions, etc. are possible and remain within the scope of the present invention.

Figure 11:
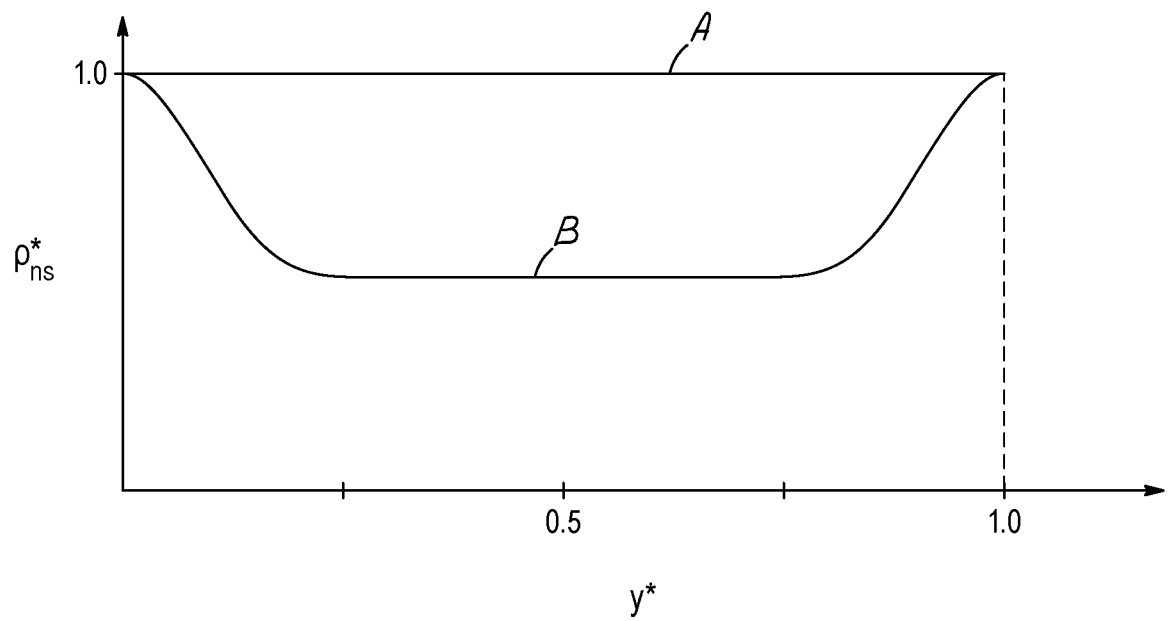
FIG. 11 is a schematic density distribution of normal spindles of the web structure in the chordwise direction.

As noted above, although the chordwise panels 62 illustrated in FIG. 4 include normal spindles 70 only at the leading and trailing edge sides of the web structure 50, additional normal spindles 70 may be distributed along the chordwise direction of the chordwise panels 62 of the web structure 50. Similar to the above, this distribution may be constant in the chordwise direction or may vary in the chordwise direction, depending on an expected localized load condition on the shear web 44, such as that illustrated in FIG. 9, for example. Accordingly, the density distribution of the normal spindles 70 in the chordwise panel 62 may be as illustrated in FIG. 11, with curve A illustrating a uniform density distribution of normal spindles 70 and curve B illustrating a varying density distribution of normal spindles 70. In this latter embodiment, for example, more normal spindles 70 may be positioned adjacent the leading edge and trailing edge sides of the panel 62 (with smaller spacing between adjacent spindles 70), and fewer normal spindles 70 may be positioned in the mid-region of the panel 62 (with greater spacing between adjacent spindles 70). The distributions of normal spindles 70 in the chordwise panel 62 according to that illustrated in FIG. 11 are but two possible distributions. Thus, it should be recognized that other distributions of normal spindles 70 in the chordwise panel 62 that accommodate uniformity, expected load conditions, etc. are possible and remain within the scope of the present invention.

In one embodiment (not shown), the chordwise panels 62 may be uniformly distributed along the spanwise direction of the shear web 44. In another embodiment, however, the distribution of the chordwise panels 62 along the spanwise direction of the shear web 44 may vary depending on the expected localized load conditions on the shear web 44. Recall that FIG. 5 illustrates a characteristic load condition on the shear web 44 in the spanwise direction during operation. Thus, in general and in accordance with an aspect of the invention, there will be more chordwise panels 62 in high load regions of the shear web 44 and fewer chordwise panels 62 in lower load regions of the shear web 44. This concept may perhaps be best visualized with reference to FIG. 6. In this regard, imagine that each normal spindle 64 illustrated in that figure is associated with a chordwise panel 62 that extends into the paper and thus not visible from the perspective in that figure.

Figure 12:
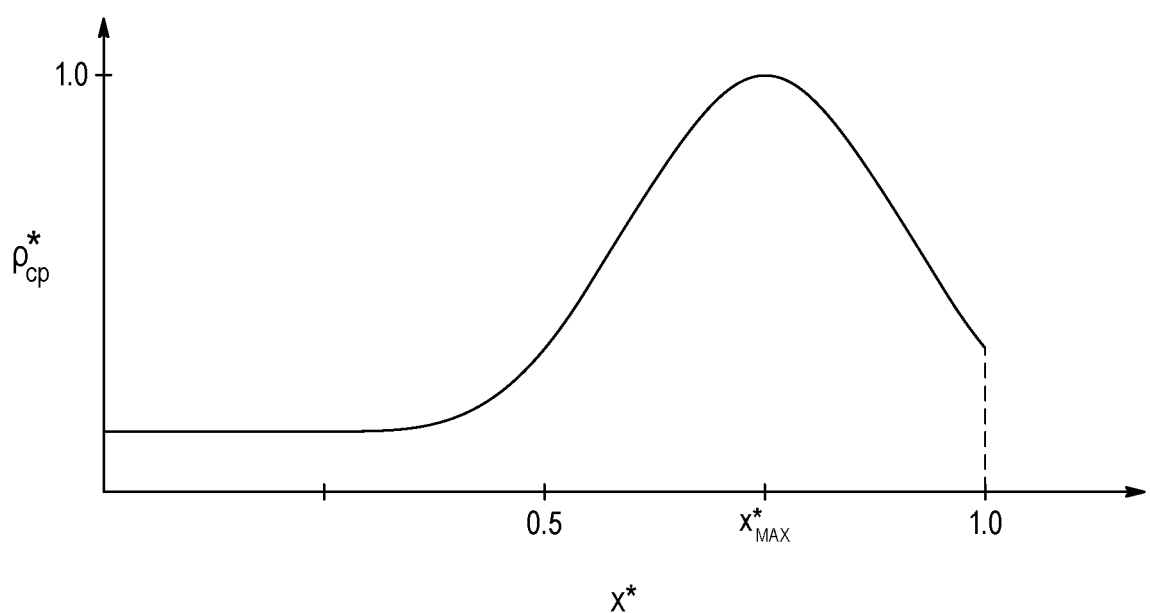
FIG. 12 is a schematic density distribution of chordwise panels of the web structure in the spanwise direction based on expected load conditions.

FIG. 12 is a schematic illustration of a characteristic density distribution of chordwise panels 62 in the spanwise direction of the shear web 44. In this figure, $\rho_{cp}$ is the localized density of chordwise panels, i.e., the mass of composite material that forms the chordwise panels 62 per unit volume of the web structure 50 in the spanwise direction of the shear web 44; and $\rho^*_{cp}$ is a normalized density based on the maximum density value in the spanwise direction of the web structure 50 (i.e., $\rho^*_{cp} = \rho_{cp}/\rho_{Max,cp}$). As demonstrated in FIG. 12, in an exemplary embodiment, distribution of chordwise panels 62 in the spanwise direction of the web structure 50 may be such that the normalized density distribution of chordwise panels 62 is a substantially stochastic distribution about the location of maximum load in the web structure 50 (i.e., with the maximum of the distribution at $x^*_{Max}$). The distribution of chordwise panels 62 in the spanwise direction according to that illustrated in FIG. 12 is but one possible distribution based on an expected load condition of the wind turbine blade 20 and shear web 44. Thus, it should be recognized that other distributions that accommodate strength requirements based on expected load conditions are possible and remain within the scope of the present invention.

The discussion above generally described the possible distribution of cross spindles 68 and possibly normal spindles 70 in the chordwise direction for a chordwise panel 62. Consideration, however, should also be given to variations in the chordwise panels 62 as a function of their position in the spanwise direction of the web structure 50. In one embodiment, for example, the chordwise panels 62 may all be the same no matter where they are located along the spanwise direction of the web structure 50. That is, each chordwise panel 62 has the same cross spindle 68 (and perhaps normal spindle 70) distribution. In an alternative embodiment, however, the chordwise panels 62 may vary depending on where the panels 62 are located along the spanwise direction of the web structure 50. This variation may depend, for example, on an expected localized load condition on the web structure 50.

Figure 13A:
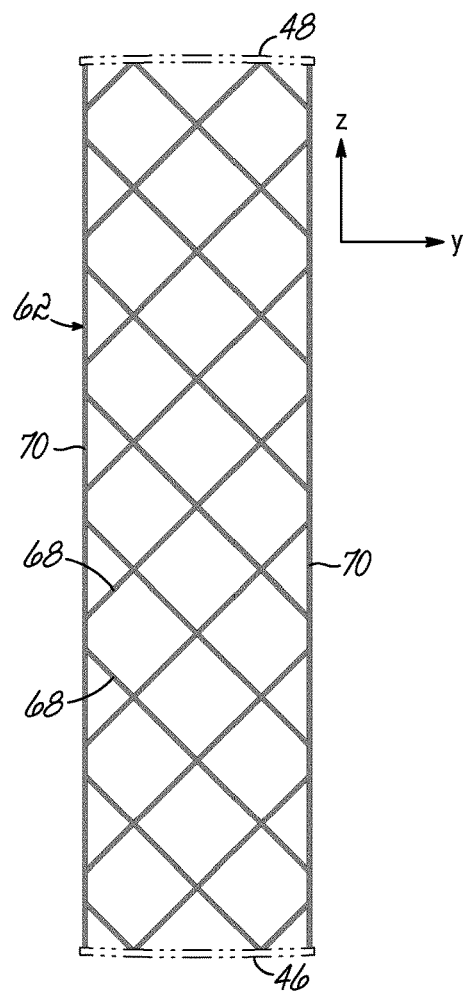
FIG. 13A is a front plan view of a chordwise panel for a low load region of the web structure.
Figure 13B:
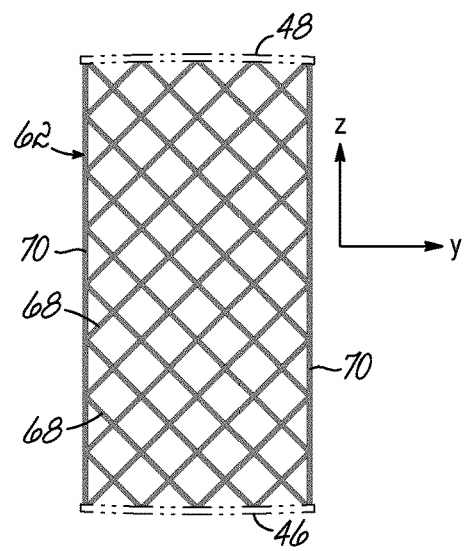
FIG. 13B is a front plan view of a chordwise panel for a high load region of the web structure.

By way of example and without limitation, based on the characteristic load distribution shown in FIG. 5, the density of the cross spindles 68 in a chordwise panel 62 located in a low load region, such as adjacent the root end 26 of the blade 20, may be less than the density of the cross spindles 68 in a chordwise panel 62 located in a high load region, such as in the outer portion of the blade (e.g., $x^*_{Max}$). This general relationship is schematically reflected in FIGS. 13A and 13B. More particularly, FIG. 13A illustrates a chordwise panel 62 having cross spindles 68 with a relatively low density that might be more appropriately positioned adjacent the root end 26 of the blade 20 where lower loads are expected. FIG. 13B, on the other hand, illustrates a chordwise panel 62 having cross spindles 68 with a relatively high density that might be more appropriately positioned in the outer region of the blade 20 where higher loads are expected.

Figure 14:
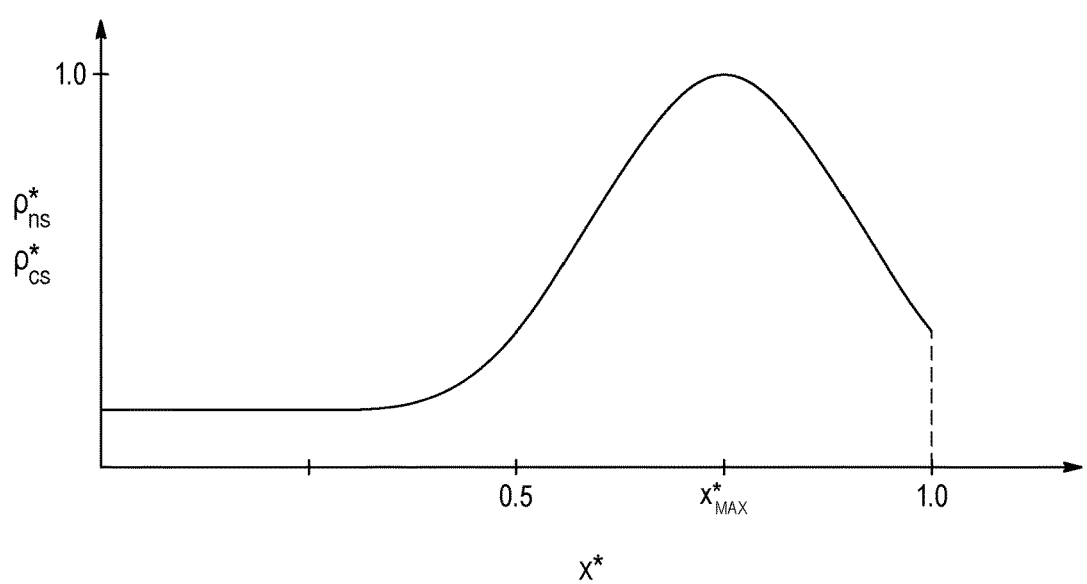
FIG. 14 is a schematic density distribution of cross spindles in chordwise panels as a function of spanwise position based on expected load conditions.

Thus, the density of the cross spindles 68 in the chordwise panels 62 vary as a function of spanwise position. This variation may be illustrated in an exemplary embodiment by that shown in FIG. 14. As demonstrated in this figure, the density of cross spindles 68 in the chordwise panels 62 may be such that the normalized density distribution is a substantially stochastic distribution about the location of maximum load in the web panel 62 (i.e., with the maximum of the distribution at $x^*_{Max}$). The distribution according to that illustrated in FIG. 14 is but one possible distribution based on expected load conditions of the wind turbine blade 20 and web structure 50. Thus, it should be recognized that other distributions that accommodate strength requirements based on expected load conditions are possible and remain within the scope of the present invention. Should the chordwise panels 62 also include a distribution of normal spindles 70, the density of normal spindles 70 in the panels 62 may likewise vary based on position in the spanwise direction of the web structure 50. Thus, a chordwise panel 62 in a low load region would include fewer normal spindles than a chordwise panel 62 in a high load region. The density of normal spindles 70 in the chordwise panels 62 may similarly have a substantially stochastic distribution about the location of maximum load in the web structure 50.

Figure 15:
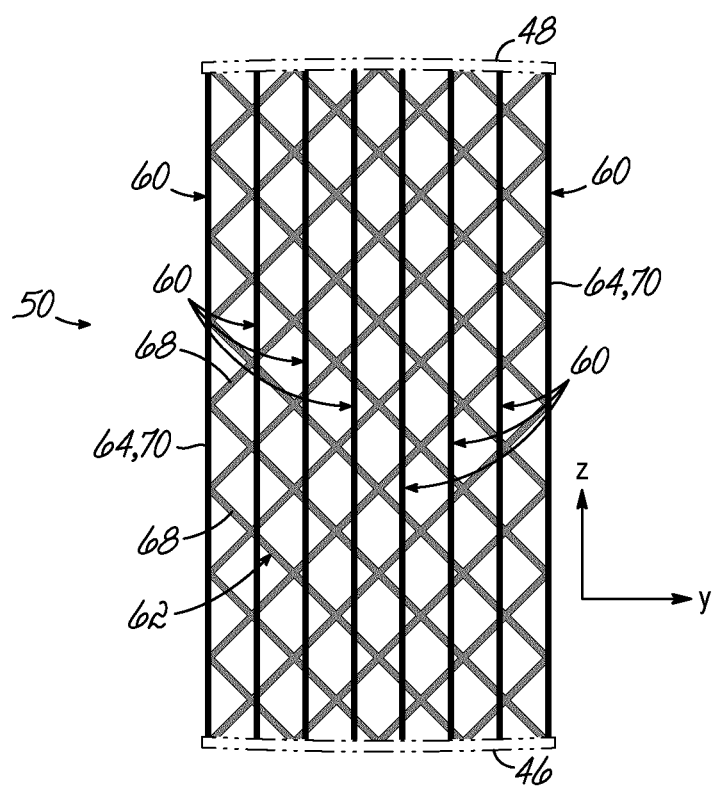
FIG. 15 is a cross-sectional view of a shear web in accordance with another embodiment of the invention having a plurality of spanwise panels.
Figure 16:
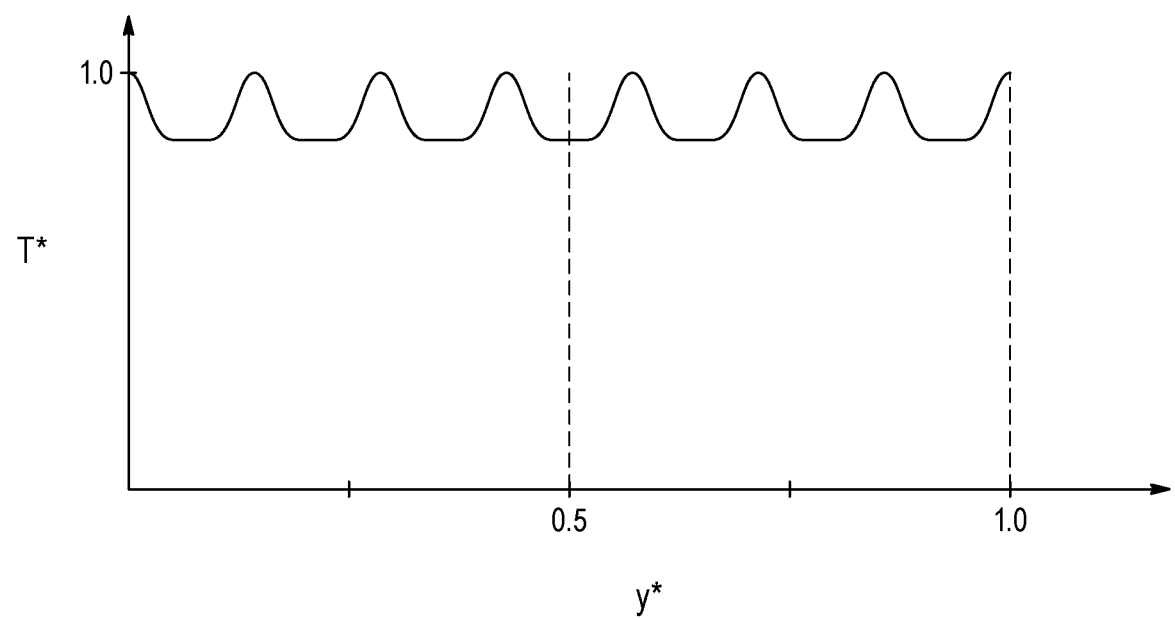
FIG. 16 is another schematic characteristic load condition on a web structure of a shear web in the chordwise direction of the blade.

As noted above, although the web structure 50 illustrated in FIGS. 3 and 4 includes only two spanwise panels 60 at the leading edge side and trailing edge side of the web structure 50, there may be additional spanwise panels 60 distributed in the chordwise direction of the web structure 50. FIG. 15, for example, illustrates a web structure 50 having more than two spanwise panels 60 (e.g., 8 spanwise panels 60) distributed in the chordwise direction of the web structure 50. This concept may perhaps be best visualized by imagining that each normal spindle illustrated in that figure is associated with a spanwise panel 60 that extends into the paper and thus not visible from the perspective in that figure. In an exemplary embodiment, the spanwise panels 60 may be uniformly distributed in the chordwise direction of the web structure 50, as illustrated in FIG. 15. FIG. 16 is a schematic illustration of a characteristic load condition on the shear web 44 in the chordwise direction of the web structure 50 similar to that shown in FIG. 9. Similar to the above, the maximum in the shear load is located at the spanwise panels 60 and decreases slightly between the spanwise panels 60. However, the addition of more spanwise panels 60 has further reduced the peak shear load and more uniformly distributed the load across the shear web 44 in the chordwise direction. The distribution of spanwise panels 60 in the chordwise direction according to that illustrated in FIGS. 15 and 16 is but one possible distribution. Thus, it should be recognized that other distributions that accommodate load uniformity, expected load conditions, etc. are possible and remain within the scope of the present invention.

The discussion above generally described the possible distributions of normal spindles 64 and cross spindles 66 in the spanwise direction for a spanwise panel 60 (e.g., see FIG. 6). Consideration, however, should also be given to variations in the spanwise panels 60 as a function of their position in the chordwise direction of the web structure 50. In an exemplary embodiment, for example, the spanwise panels 60 may all be the same no matter where they are located along the chordwise direction of the web structure 50. That is, each spanwise panel 60 has the same normal spindle 64 and/or cross spindle 66 distributions. In an alternative embodiment, however, the spanwise panels 60 may differ depending on where the panels 60 are located along the chordwise direction of the web structure 50.

Based on the above, the design of the three-dimensional open lattice construction of the web structure 50 provides multiple ways to vary the strength depending on the expected load conditions on the shear web 44. The general concept is that the web structure 50 may include more fibrous composite spindles in higher load regions of the web structure 50 and less fibrous composite spindles in lower load regions of the web structure 50. The three-dimensional arrangement of the web structure 50 may be attained by providing a plurality of first open lattice panels 60 that intersect with a plurality of second open lattice panels 62. The plurality of first panels 60 may be spanwise panels generally extending in the spanwise direction and the plurality of second panels 62 may be chordwise panels generally extending in the chordwise direction. Each panel 60, 62 includes a plurality of fibrous composite spindles extending within the primary plane defined by the panels 60, 62. The spanwise panels 60, for example, may include cross spindles 66 and possibly normal spindles 64 that have an orientation relative to the spanwise direction of the spanwise panels 60. Similarly, the chordwise panels 62 may include cross spindles 68 and possibly normal spindles 70 that have an orientation relative to the chordwise direction of the chordwise panels 62.

The strength of the web structure 50 may be enhanced in high load regions in different ways. For example, for high load regions in a spanwise direction, the local strength of the web structure 50 may be increased by one or more of: i) increasing the number of chordwise panels 62; ii) increasing the normal and/or cross spindle density in the chordwise panels 62; and iii) increasing the normal and/or cross spindle density in the spanwise panels 60. Moreover, in a chordwise direction, uniformity of load or local variation in strength of the web structure 50 may be accommodated by: i) increasing the number of spanwise panels 60 distributed in the chordwise direction; and ii) increasing the normal and/or cross spindle density in the chordwise panels 62. Accordingly, it should be appreciated that designers have multiple options for providing variations in the strength of the web structure 50 to accommodate the expected load conditions on the wind turbine blade 20 and shear web 44 during operation of the wind turbine 10 and multiple options for providing a more uniform distribution of loads across the shear web 44 and bond region between the flanges 46, 48 and spar caps 40, 42.

In this regard, it should be understood that designers may use any combination of the above options to vary the strength response of the web structure 50. By providing a web structure 50 having a three-dimensional open lattice construction formed by fibrous composite spindles, not only can strength be more specifically tailored to expected load conditions but the weight of the web structure 50 may also be reduced compared to conventional moulded web structures. Thus, through greater design flexibility, shear webs having very high strength-to-weight ratios may be provided to wind turbine blade constructions. This improvement will, in turn, allow further increases in the length of wind turbine blades (and the associated energy capture) at a reduced weight and a reduced cost while also maintaining the structural integrity of the blade.

As discussed above, one drawback of current shear web designs is that the forces along the bond region between the flanges of the shear web and the spar caps are concentrated along a central region of the flanges. Thus, a significant portion of the forces transferred from the outer shell to the spar structure occur in a relatively small width of the bond region. The open lattice construction of the shear web 44 also allows the shear load in the shear web 44 to be more uniformly distributed over a greater portion of the spar caps 40, 42 and flanges 46, 48. This reduces the peak shear load in the bond region between the flanges 46, 48 and the spar caps 40, 42. This improvement in load distribution prevents strength limitations in the bond region from inhibiting further increases in blade length.

In the above, the flanges 46, 48 of the shear web 44 were described as being conventional with a laminate composite construction while the web structure 50 had a three-dimensional open lattice construction. In another embodiment, the flanges 46, 48 may have an open lattice construction while the web structure has a conventional laminate composite construction. In still a further embodiment, the flanges 46, 48 and the web structure 50 (i.e., essentially the entirety of the shear web 44) may have a multi-dimensional open lattice construction similar to that described above.

Figure 17:
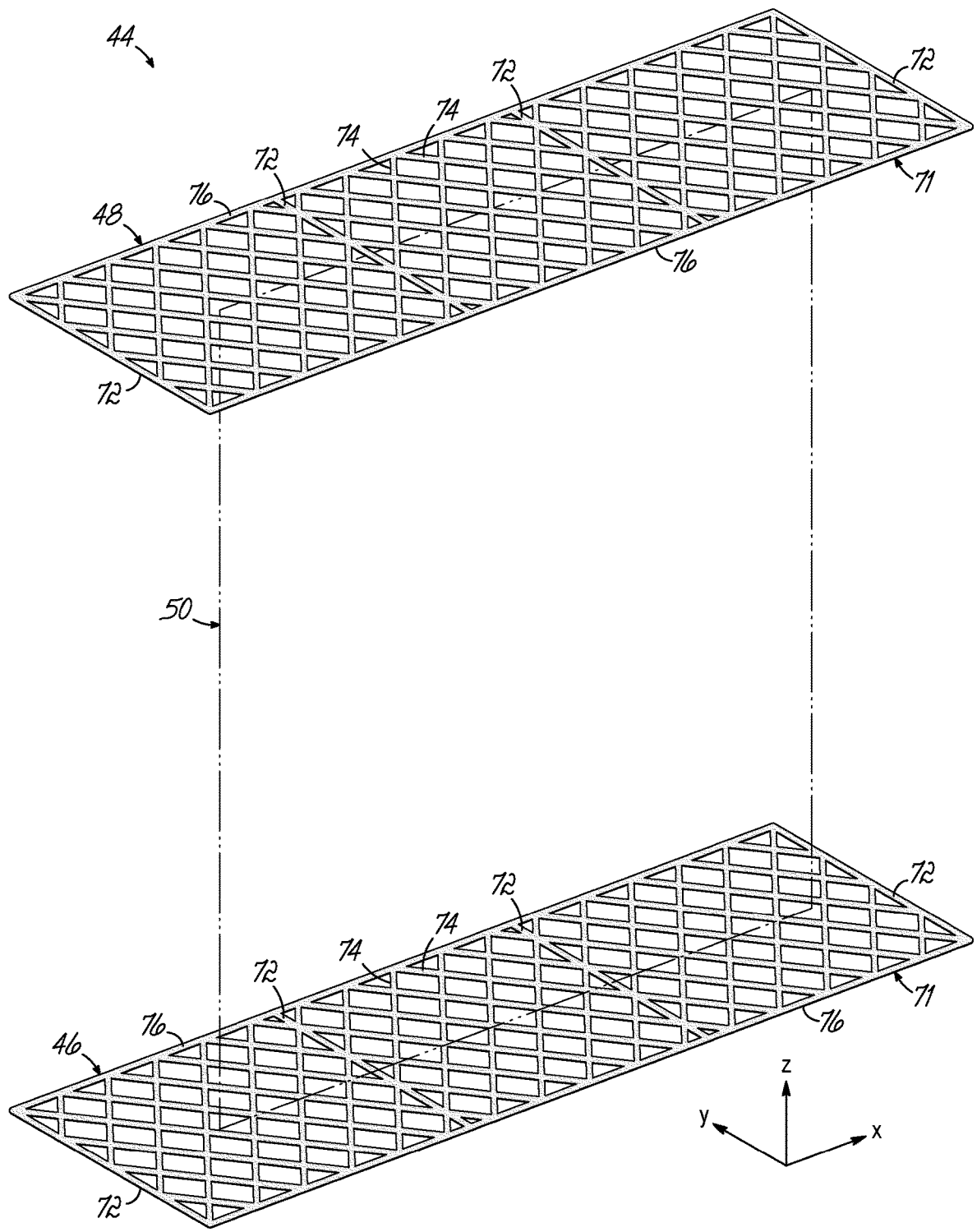
FIG. 17 is a perspective view of a shear web having flanges in accordance with an embodiment of the invention.

In this regard, FIG. 17 illustrates a shear web 44 having a lower flange 46, an upper flange 48 and an intermediate web structure 50 (shown schematically) extending between the lower and upper flanges 46, 48. In this embodiment, the upper and lower flanges 46, 48 have an open lattice construction of fibrous composite material similar to the panels 60, 62 described above. The open lattice construction includes a plurality of elongate structural members of fibrous composite material intersecting each other to form a web-like network of interconnected spindles that collectively form the flanges 46, 48. Accordingly, the flanges 46, 48 in accordance with aspects of the invention do not have a solid-body construction like moulded or pultruded flange structures of conventional shear webs but include a lattice arrangement with selectively positioned spindles and void space. The concept embodied in the open lattice construction is that the load-bearing capacity of the flanges 46, 48 may be significantly increased, such as by arrangement of the spindles, while minimizing the overall weight of the flanges 46, 48 by having significant void space.

Similar to the above, the open lattice construction of the flanges 46, 48 not only provides for increased strength at lower weight, but also provides increased design flexibility through localized arrangements of the spindles based on estimated local load conditions. Thus, through the arrangement of the fibrous composite spindles, the flanges 46, 48 may be configured to have high strength in localized regions subjected to high load conditions and reduced strength in localized regions subjected to lower load conditions. In other words, in expected regions of high load, the flanges 46, 48 may include a greater number of spindles per unit volume, and in expected regions of low load, the flanges 46, 48 may include fewer spindles per unit volume. The latticed configuration of the flanges 46, 48 of the shear web 44 in this embodiment may also be formed through continuous fiber-reinforced additive manufacturing methods as described above.

The open lattice construction of the flanges 46, 48 may include panels 71 similar to the panels 60, 62 described above but having an orientation that has the faces of the panels 71 directed toward the windward and leeward sides of the blade 20 instead of toward the leading and trailing edges 34, 36 of the blade 20. More particularly, the panels 71 may be arranged such that the primary plane of the panels extends in the spanwise direction x and the chordwise direction y, and the significantly smaller extent of the panels 71 extends in the thickness wise direction z. The flanges 46, 48, and thus the panels 71, may be thought of as generally extending along the length of the blade 20 in the spanwise direction (i.e., the extension direction for panels 71). Each of the panels 71 that define flanges 46, 48 includes a plurality of fibrous composite spindles in different orientations that intersect with each other at multiple nodes within the primary plane generally defined by the panels 71. In an exemplary embodiment, however, the spindles in the panels 71 may be arranged relative to the spanwise direction of the panels 71. For example, the fibrous composite spindles of the panels 71 may include normal spindles 72 and cross spindles 74 relative to the spanwise direction of the panels 71. In an exemplary embodiment, the normal spindles are substantially perpendicular to the spanwise direction and the cross spindles 74 may be arranged at +/−45 degrees relative to the spanwise direction of the panels 71 in criss-cross fashion. However, other uniform and/or non-uniform angles of the cross spindles 74 are also possible. The panels 71 that define flanges 46, 48 may also include edge spindles 76 positioned at the leading-edge side and trailing-edge side of the flanges 46, 48. Edge spindles may, however, be omitted from the flanges 46, 48. In one embodiment, the panels 71 may include only or primarily cross spindles 74. In an alternative embodiment, however, the panels 71 may include a combination of cross spindles 74 and normal spindles 72.

Similar to the above, the distribution of the normal and cross spindles 72, 74 in the spanwise direction of the flanges 46, 48 may vary depending on the expected localized load conditions on the shear web 44, and the flanges 46, 48 more particularly. Thus, the density of normal spindles 72 in the spanwise direction of the flanges 46, 48 may vary, with a higher density in high load regions and lower density in lower load regions. Additionally or alternatively, the density of the cross spindles 74 in the spanwise direction of the flanges 46, 48 may vary, with a higher density in high load regions and lower density in lower load regions. Accordingly, manufacturers also have multiple options when designing the flanges 46, 48 of the shear web 44 based on an expected load condition. By providing flanges having an open lattice construction formed by fibrous composite spindles 72, 74, 76, not only can strength be more specifically tailored to expected load conditions but the weight of the flanges 46, 48 may be reduced compared to conventional moulded web structures. Thus, flanges 46, 48 of shear web 44 having very high strength-to-weight ratios may be provided to wind turbine blade constructions.

Figure 18:
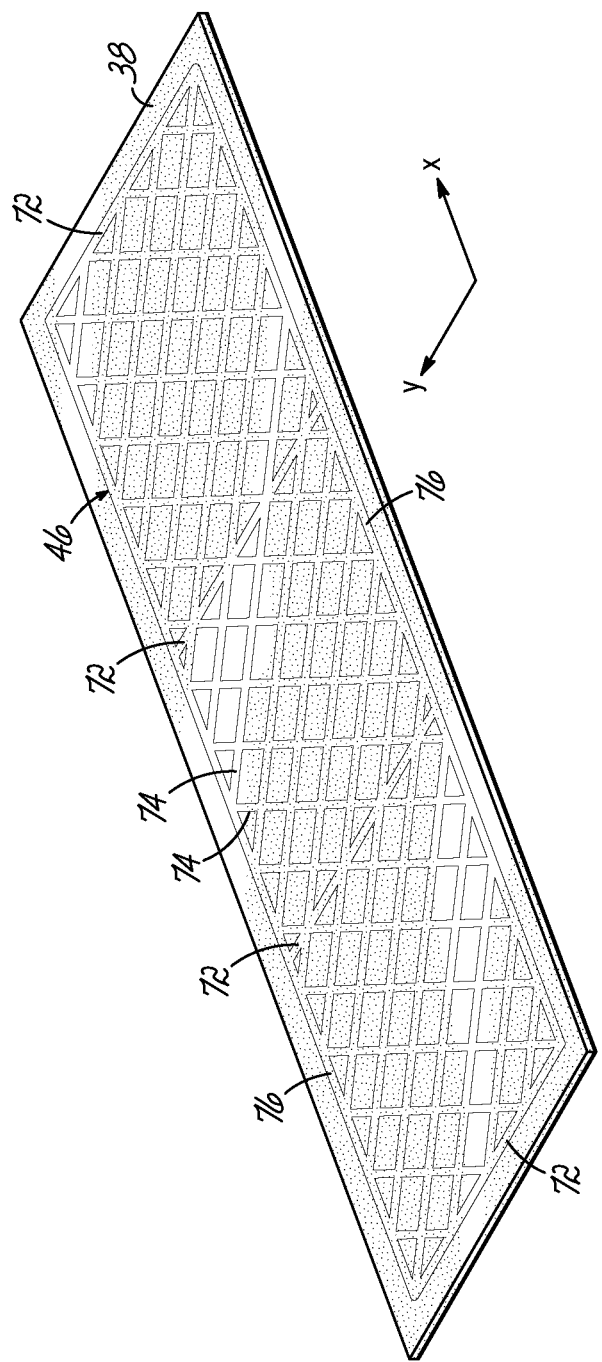
FIG. 18 illustrates the attachment of a flange illustrated in FIG. 17 to a surface through adhesive bonding.

In addition, providing the flanges 46, 48 as open lattice constructions may also improve the connection of the shear web 44 to the spar caps 40, 42 of the spar structure 24. As illustrated in FIG. 18, when the flanges 46, 48 are bonded to the spar caps 40, 42, sufficient pressure may be applied such that the flanges 46, 48 become immersed or embedded within the adhesive used to form the bond. Thus, the bond interface becomes three dimensional. This is in contrast to solid planar flanges in conventional shear webs where the bond interface is two-dimensional (i.e., the bond forms between the adhesive and the generally planar surface of the flange). Furthermore, although the flanges 46, 48 in this embodiment are not solid, but of a lattice construction, because the adhesive comes into contact with most or all of the surface of the spindles 72, 74, 76 of the flanges 46, 48, the total bonding surface area between the adhesive and the flange may be increased. In any event, it is believed that for one or both of these reasons, the bond between the shear web 44 and the spar caps 40, 42 will be improved by configuring the flanges 46, 48 as open lattice structures.

Figure 19:
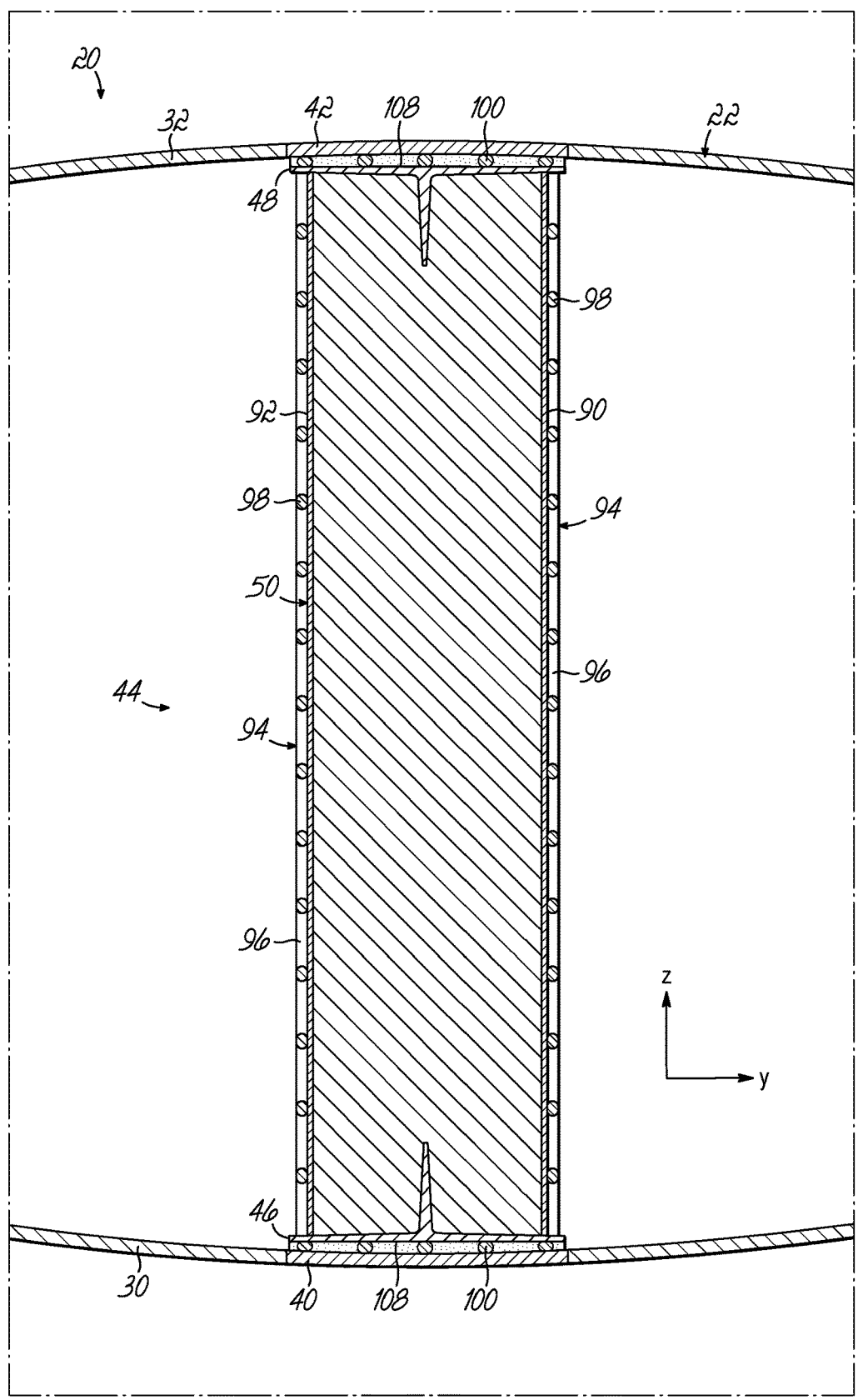
FIG. 19 is a cross-sectional view of a shear web for a wind turbine blade in accordance with another embodiment of the invention.

As discussed above, various embodiments employ a hybrid type of approach to shear web design, where some portion of the shear web includes, for example, a 3D printed lattice structure that complements other portions of the shear web 44 formed through more conventional processes. By way of example, an embodiment where the flanges 46, 48 of the shear web 44 have a conventional construction but the web structure 50 is of a three-dimensional open lattice design was discussed in detail above. Another embodiment where the flanges 46, 48 of the shear web 44 have an open lattice design but the web structure has a conventional construction was also described above. FIG. 19 is a cross sectional view of another hybrid type of shear web 44 having conventional portions and an open lattice structure formed by a continuous fiber-reinforced additive manufacturing process in accordance with aspects of the invention.

In this regard, the shear web 44 includes a lower flange 46, an upper flange 48, and an intermediate web structure 50 extending between the lower and upper flanges 46, 48. The intermediate web structure 50 may have a conventional construction of fiber layers, core material, and resin. The upper and lower flanges 46, 48 may be conventional and have a laminate composite construction. Alternatively, the upper and lower flanges may be formed through a pultrusion process. The shear web 44 may be formed through conventional moulding processes, for example.

The (thus far) conventionally-made shear web 44 includes a web structure 50 having a first face 90 that generally confronts the leading edge 34 of the blade 20 and a second face 92 that generally confronts the trailing edge 36 of the blade 20 when the shear web 44 is in an operational position within the blade 20. In this embodiment, an open lattice structure 94 may be formed on at least one and preferably both of the first and second faces 90, 92 of the web structure 50. The addition of the open lattice structure 94 to the at least one face 90, 92 of the web structure 50 may be through continuous fiber-reinforced additive manufacturing methods. In this regard, the at least one face 90, 92 may confront the print head of the 3-D printer and the open lattice structure 94 printed directly on the at least one face 90, 92 of the web structure 50. The open lattice structure 94 may be constructed in a manner similar to the spanwise panels 60 of the web structure 50 described above and include a plurality of normal (e.g., vertical) spindles 96 and cross spindles 98 that intersect with each other at multiple nodes within the primary plane that defines the panel.

Similar to the discussion above, the density of the normal spindles 96 and/or the density of the cross spindles 98 may vary in the spanwise direction depending on the local load conditions on the web structure 50. Thus, the density of normal spindles 96 in the spanwise direction of the web structure 50 may vary, with a higher density in high load regions and lower density in lower load regions. Additionally or alternatively, the density of the cross spindles 98 in the spanwise direction of the web structure 50 may vary, with a higher density in high load regions and lower density in lower load regions. Accordingly, manufacturers also have multiple options when designing the web structure 50 of the shear web 44 based on an expected load condition. While the inclusion of the open lattice structure 94 to at least one face 90, 92 of the web structure 50 increases weight, the overall strength of the shear web 44 is increased. Thus, a single shear web in accordance with the present design may replace spar structures having multiple shear webs (i.e., the spar structure has fewer shear webs). Accordingly, the overall weight of the spar structure may be reduced.

In an alternative embodiment, in addition to the open lattice structure 94 formed on at least one of the faces 90, 92 of the web structure 50, an open lattice structure 100 similar to structure 94 may also be formed on the flanges 46, 48 of the shear web 44, such as on an outer face 108 of the flanges 46, 48. These open lattice structures 100 provide increased strength to the flanges 46, 48 and may improve the bonding of the flanges 46, 48 to the spar caps 40, 42 of the spar structure 24. The overall extent of the flanges 46, 48 in the thickness wise direction may also be reduced due to the load carrying capability of the open lattice structures 100. In still a further embodiment, the open lattice structures 100 may be formed on the flanges 46, 48 with the web structure being of a conventional design with no open lattice structure 94 formed thereon. Thus, in at least some of the hybrid embodiments, open lattice structures 94, 100 may be selectively added to various portions of a conventionally made shear web 44, including along at least some portion of the web structure 50 and/or flanges 46, 48 to increase strength.

Figure 22:
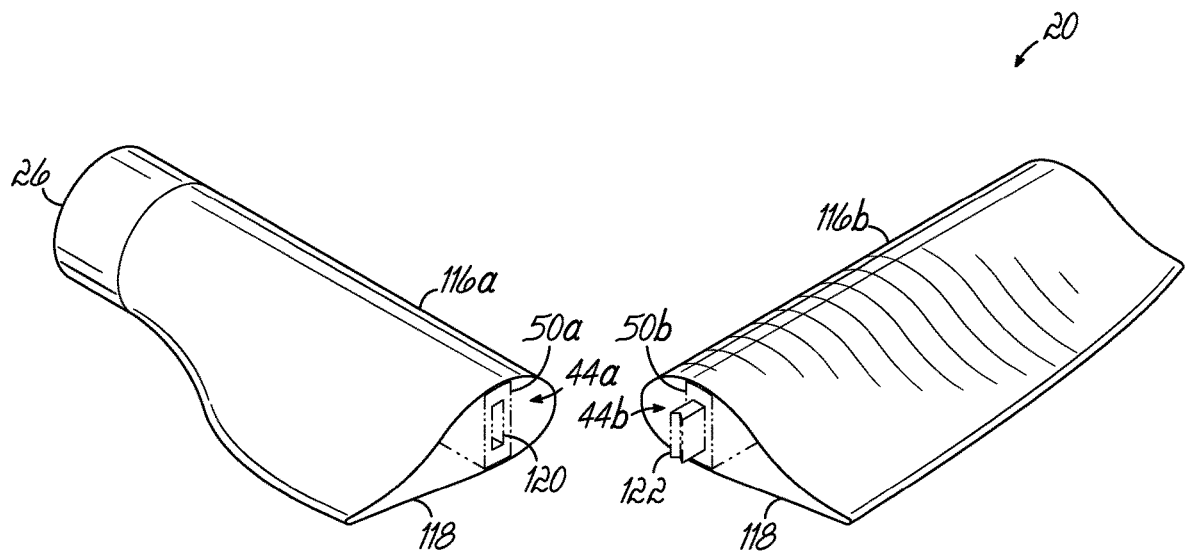
FIG. 22 illustrates a connection of the shear web across a connection joint of a sectional wind turbine blade.

The design freedom afforded to the shear web as a result of continuous fiber-reinforced additive manufacturing may provide other advantages and address other issues related to shear web design for wind turbine blades. One issue, for example, is that the shear web is typically subjected to relatively high peel loads near the root end of the wind turbine blade. Due to the design flexibility afforded by aspects of the present invention, peel loads in the root end of the blade may be reduced by providing a force path that extends predominantly in the spanwise direction of the shear web. In an exemplary embodiment, this may be achieved by two means. First, as illustrated in FIG. 22, the shear web 44 may include at the root end 26 of the blade 20 a portion of the flanges 46, 48 that extends beyond the intermediate web structure 50 in the spanwise direction (i.e., there is no corresponding web structure between the two opposed flanges). This portion of the flanges 46, 48 is referred to herein as the flange extension tab 104.

Figure 20:
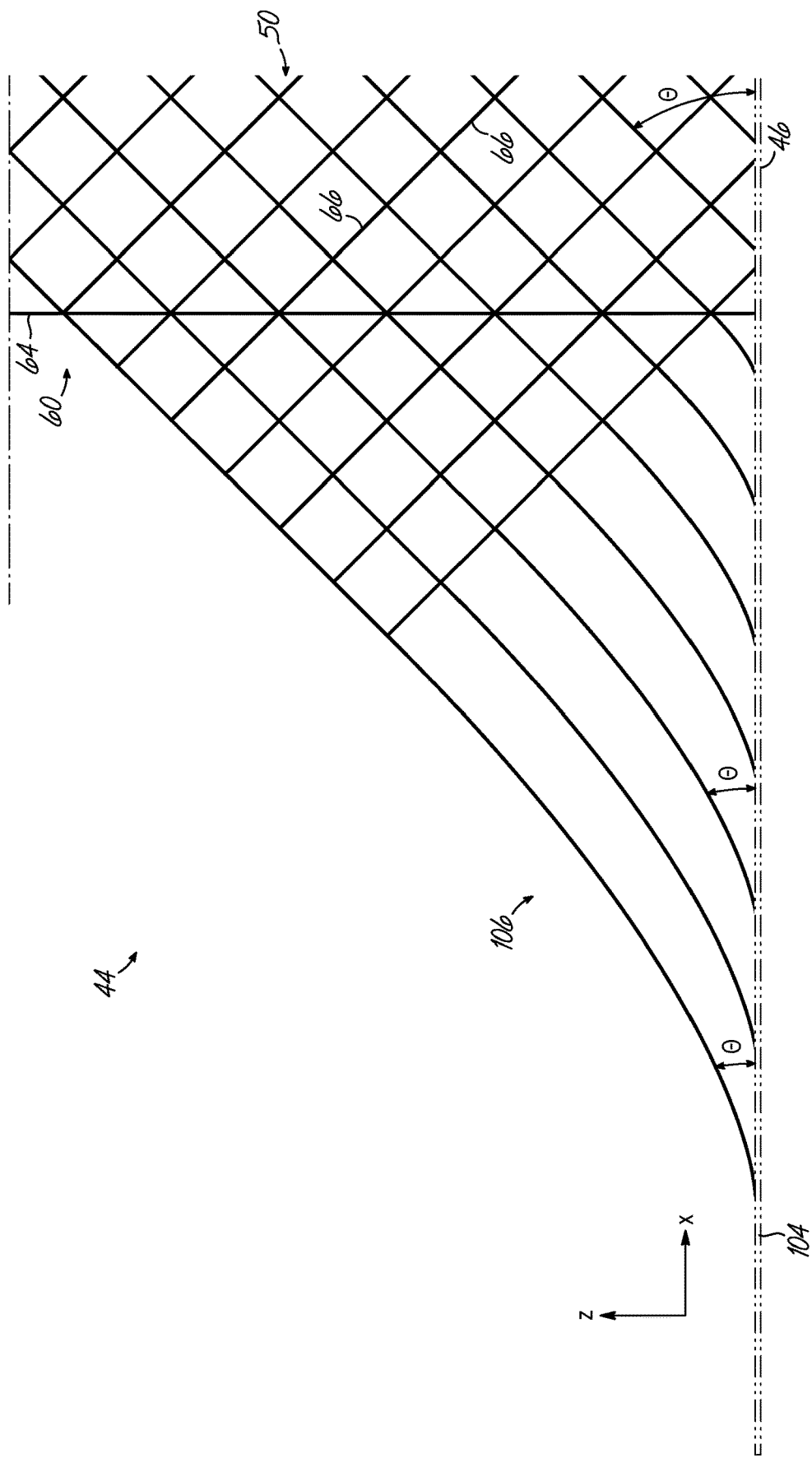
FIG. 20 is a side plan view of a shear web configuration adjacent a root end of the wind turbine blade.

Second, and as also demonstrated in FIG. 20, in a transition region 106 of the intermediate web structure 50 adjacent the root end 26 of the blade 20, the composite spindles 64, 66, 68, 70, either in the spanwise panels 60 or the chordwise panels 62 extending away from the flanges 46, 48 become locally curved or bent (i.e., swept) in a smooth manner so as to intersect the flanges 46, 48 at a reduced angle θ. The angle θ preferably becomes progressively smaller in a direction toward the end of the web structure 50 (adjacent the root end 26 of the blade 20) in the spanwise direction. The localized and progressive curving of the spindles 64, 66, 68, 70 of the web structure 50 extending from the flanges 46, 48 in the transition region 106 of the shear web 44 adjacent the root end 26 of the blade 20, which is referred to herein as a scallop configuration, provides a force path that is more tangential to the plane defined by the flanges 46, 48. Accordingly, the forces are directed more along the spanwise direction of the flanges 46, 48 as opposed to a more transverse or perpendicular direction. This local redirection of the forces in the transition region 106 reduces the peel forces on the flanges 46, 48 of the shear web 44 adjacent the root end 26 of the blade 20.

Figure 21A:
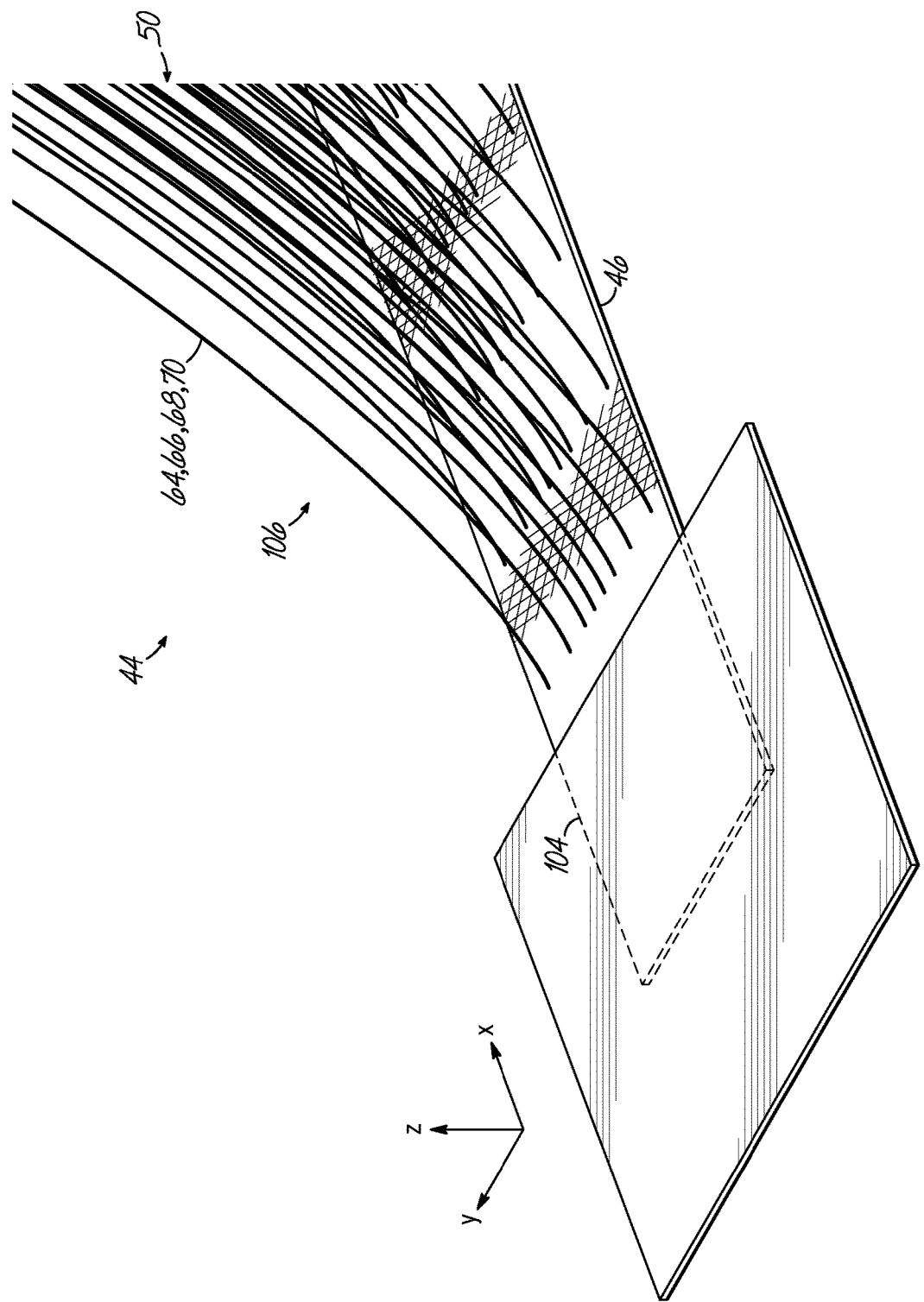
FIG. 21A illustrates the attachment of the shear web illustrated in FIG. 20 to a root end section of the wind turbine blade in accordance with one embodiment of the invention.
Figure 21B:
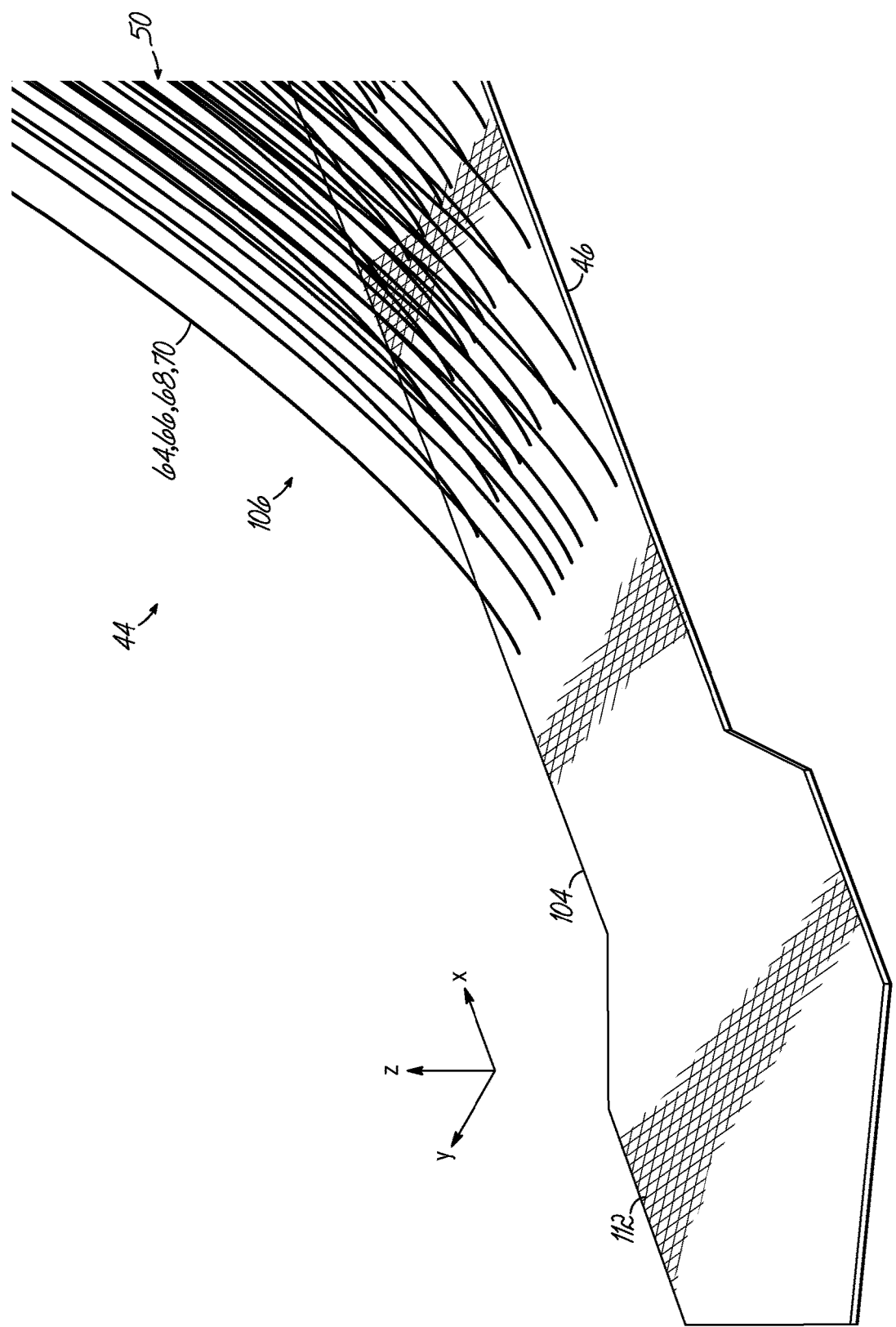
FIG. 21B illustrates the attachment of the shear web illustrated in FIG. 20 to a root end section of the wind turbine blade in accordance with another embodiment of the invention.

The extension tab 104 of the flanges 46, 48 not only facilitates the scalloped configuration of the spindles of the web structure 50 adjacent the root end 26 of the blade 20 but also provides a more convenient region for providing addition securement of the shear web 44 to the inner surface of the blade root. By way of example, FIG. 21A illustrates an embodiment where the extension tab 104 is used in an overlamination process utilizing one or more fiber layers 110 and resin to further secure the shear web 44 to the outer shell 22 at the root end 26 of the blade 20. FIG. 21B illustrates another embodiment where the extension tab 104 has a widened portion 112 (i.e., an increased width as compared to the flange widths where portions of the web structure exist) moving toward the end of the flanges 46, 48 for at least a portion of the length of the extension tab 104 (e.g., over 70% and preferably over 80% of the length of the extension tab 104). This configuration, referred to herein as a flipper configuration, provides for an increased area for adhesively bonding the shear web 44 to the outer shell 22 at the root end 26 of the blade 20. An overlamination process may also be used to provide additional securement of the shear web 44 at the root end 26 of the blade 20 (not shown). It should be understood that the above configuration of the extension tab 104 of the flanges 46, 48 applies to conventionally manufactured flanges through, for example, a moulding process, or flanges 46, 48 configured as open lattice structures manufactured through, for example, continuous fiber-reinforced additive manufacturing processes as described above.

Figure 2:
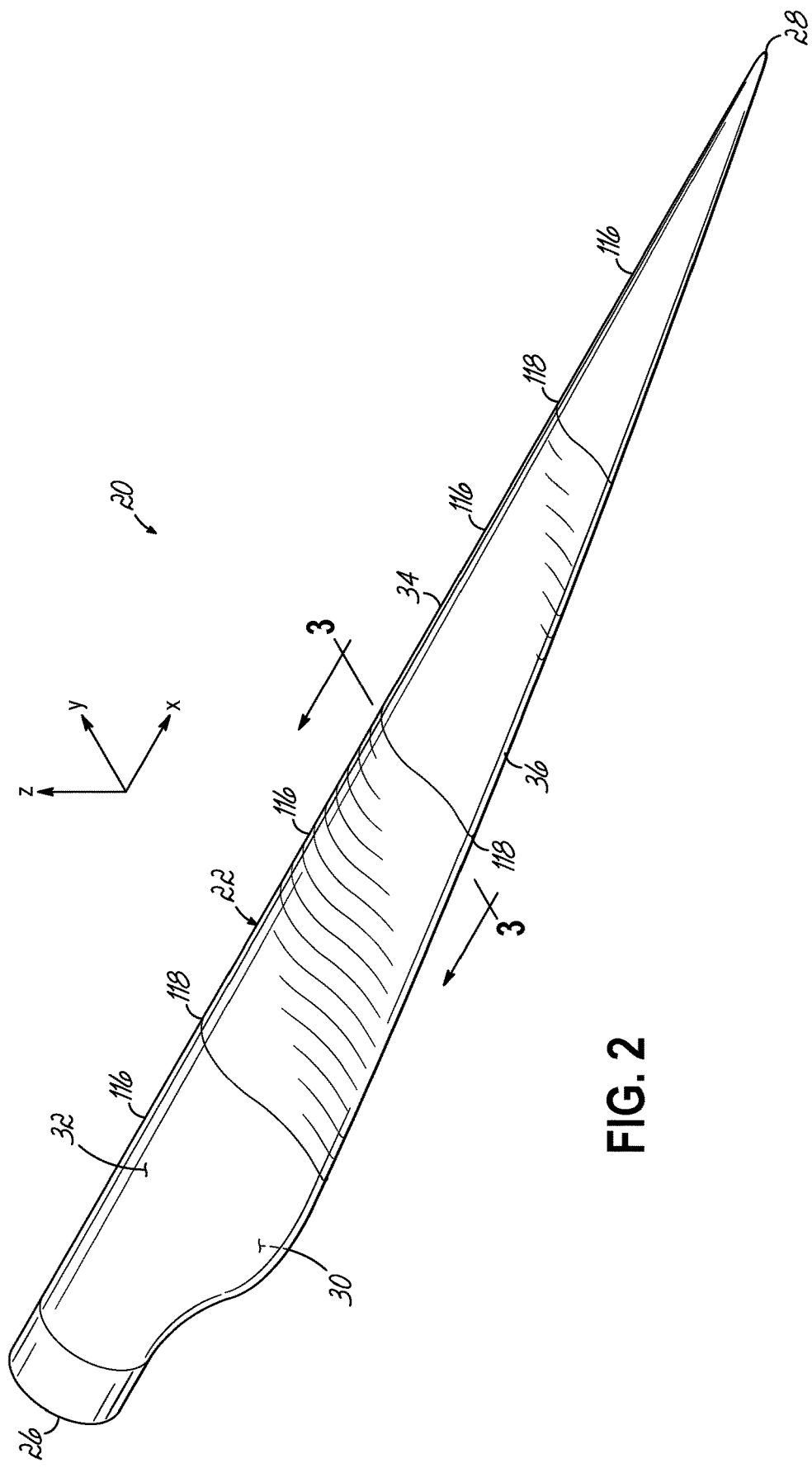
FIG. 2 is a perspective view of the wind turbine blade of FIG. 1.

As the length of wind turbine blades continue to increase, the logistics of manufacturing and transporting such elongate structures has become increasingly complex. The continued scaling of wind turbine blades and their manufacturing equipment has inherent and practical limitations. To address these limitations, sectional wind turbine blades have been developed that divide the blade into a plurality of sections which are joined end-to-end to form the wind turbine blade. FIG. 2, for example, illustrates the wind turbine blade 20 being formed by a plurality of blade sections 116 that are joined to each other at a connection interface 118. The connection interfaces 118 between adjacent blade sections 116 may present a point of weakness in the structural integrity of the wind turbine blade 20 and are often reinforced to account for the application and transfer of loads on the blade 20 in the region about the connecting interface 118.

Figure 23:
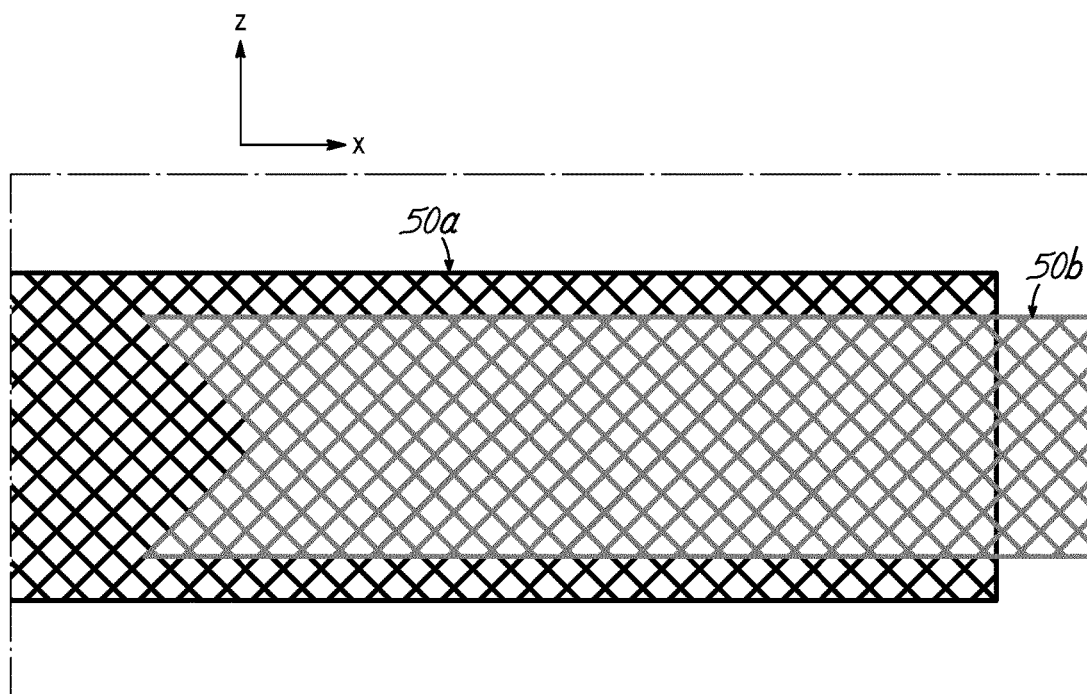
FIG. 23 illustrates the alignment of spindles of the web structure of the shear web in accordance with an embodiment of the invention.

In this regard, the shear web 44 in the respective blade sections 116 may be configured to overlap or nest in some manner to provide strength at the connection joint 118 between the sections 116. FIGS. 22 and 23 illustrate a sectional wind turbine blade 20 wherein the web structure 50a from one blade section 116a and the web structure 50b from the adjacent blade section 116b having an overlapping or nesting relationship. In this regard, the web structure 50a includes a recess 120 and the web structure 50b includes an extension 122 and the extension 122 is configured to be received in the recess 120 when the blade sections 116a, 116b are connected to each other at the connection interface 118.

In this embodiment, the configuration of the web structure 50a in the first blade section 116a and the web structure 50b in the second blade section 116b are configured to match such that the spindles that form the web structures 50a, 50b are aligned with each other when the extension 122 is received in the recess 120. FIG. 23, for example, schematically illustrates how the cross spindles 66 in a spanwise panel 60 of the web structure 50a align with the cross spindles 66 in the corresponding spanwise panel 60 of the web structure 50b. By aligning the spindles of the web structures between the first and second blade sections 116a, 116b, the force path between the lower and upper flanges 46, 48 remains continuous across the connection joint 118. This makes for a stronger connection between the blade segments 116a, 116b.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A shear web for a wind turbine blade, comprising:
   a lower flange;
   an upper flange; and
   a web structure extending between the lower and upper flanges,
      wherein at least one of the lower flange, upper flange, and the web structure includes an open lattice structure having a plurality of elongate fibrous composite spindles intersecting each other at multiple nodes of the open lattice structure, the web structure includes a three-dimensional open lattice structure, and wherein the plurality of elongate fibrous composite spindles extends in three dimensions, and wherein the web structure comprises:

a plurality of first open lattice panels, each of the plurality of first panels including a plurality of spindles extending within a plane defined by each of the plurality of first panels; and a second plurality of open lattice panels, each of the plurality of second panels including a plurality of spindles extending within a plane defined by each of the plurality of second panels, wherein the plurality of first panels intersects the plurality of second panels at multiple nodes to define the three-dimensional open lattice structure, wherein the plurality of first panels and the plurality of second panels are arranged perpendicular to one another, and wherein the plurality of first panels each extend in a first panel plane in a spanwise direction of the wind turbine blade and the plurality of second panels each extend in a second panel plane in a chordwise direction of the wind turbine blade.

2. The shear web of claim 1, wherein each of the plurality of first panels defines a first extension direction and includes a plurality of spindles non-perpendicular to the first extension direction.

3. The shear web of claim 2, wherein each of the plurality of first panels further includes a plurality of spindles perpendicular to the first extension direction.

4. The shear web of claim 1, wherein in a first extension direction, a density of spindles in high load regions of the shear web is greater than the density of spindles in low load regions of the shear web.

5. The shear web of claim 1, wherein each of the plurality of second panels defines a second extension direction and includes a plurality of spindles non-perpendicular to the second extension direction.

6. The shear web of claim 5, wherein each of the plurality of second panels further includes a plurality of spindles perpendicular to the second extension direction.

7. The shear web of claim 5, wherein a distribution of spindles is uniform in the second extension direction.

8. The shear web of claim 7, wherein in the second extension direction, a density of spindles is uniform.

9. The shear web of claim 1, wherein the plurality of second panels is non-uniformly distributed in a first extension direction.

10. The shear web of claim 9, wherein in the first extension direction, a density of second panels in high load regions of the shear web is greater than the density of second panels in low load regions of the shear web.

11. The shear web of claim 1, wherein at least one of the lower and upper flanges includes an open lattice panel oriented to extend in a first extension direction.

12. The shear web of claim 11, wherein the open lattice panel forming the at least one of the lower and upper flanges includes a plurality of spindles relative to the first extension direction.

13. The shear web of claim 12, wherein a distribution of spindles is non-uniform in the first extension direction based on a load condition of the shear web.

14. The shear web of claim 13, wherein in the first extension direction, a density of spindles in high load regions of the shear web is greater than the spindles in low load regions of the shear web.

15. The shear web of claim 1, wherein an end of the lower and upper flanges of the shear web which is configured to be located adjacent a root end of the wind turbine blade includes an extension tab.

16. The shear web of claim 15, wherein the extension tab includes a widened portion configured to increase a bonding surface area of the shear web.

17. The shear web of claim 15, wherein in a transition region adjacent the end of the lower and upper flanges of the shear web, the spindles extending from the lower and upper flanges have a scalloped configuration.

18. The shear web of claim 1, wherein the web structure has a laminate composite construction, wherein the lower and upper flanges have a laminate composite construction or pultruded construction, and wherein the open lattice structure is formed on at least one surface of the lower flange, upper flange, and the web structure.

19. The shear web of claim 18, wherein the web structure includes first and second opposed surfaces, and wherein the open lattice structure is formed on each surface of the web structure.

20. The shear web of claim 18, wherein each of the lower and upper flanges includes an outer surface, and wherein the open lattice structure is formed on the outer surface of each of the lower and upper flanges.

21. A wind turbine blade comprising:

a shear web, comprising:

a lower flange;

an upper flange; and a web structure extending between the lower and upper flanges, wherein at least one of the lower flange, upper flange, and the web structure includes an open lattice structure having a plurality of elongate fibrous composite spindles intersecting each other at multiple nodes of the open lattice structure, wherein the web structure includes a three-dimensional open lattice structure, and wherein the plurality of elongate fibrous composite spindles extends in three dimensions, and wherein the web structure further comprises:

a plurality of first open lattice panels, each of the plurality of first panels including a plurality of spindles extending within a plane defined by each of the plurality of first panels; and a second plurality of open lattice panels, each of the plurality of second panels including a plurality of spindles extending within a plane defined by each of the plurality of second panels, wherein the plurality of first panels intersects the plurality of second panels at multiple nodes to define the three-dimensional open lattice structure, and wherein each of the plurality of first panels defines a first extension direction and includes a plurality of spindles non-perpendicular to the first extension direction, and a distribution of spindles is non-uniform in the first extension direction.

22. The wind turbine blade of claim 21, wherein the blade further comprises a first blade section and a second blade section configured to be joined at a connection interface, wherein the first and second blade sections include a first shear web portion and a second shear web portion, respectively, wherein at least the web structure of the first shear web portion and the web structure of the second shear web portion are configured to connect with each other in a nesting relationship when the first and second blade sections are joined together; and wherein an arrangement of the spindles in the web structure of the first shear web portion and an arrangement of the spindles in the web structure of the second shear web portion are such that spindles of the shear web are aligned across the connection interface.

23. A method of making a shear web for a wind turbine blade, comprising:
providing a lower flange;
providing an upper flange;
providing a web structure configured to extend between the lower and upper flanges;
forming at least one of the lower flange, upper flange, and web structure with an open lattice structure having a plurality of elongate fibrous composite spindles intersecting each other at multiple nodes of the open lattice structure, wherein the web structure is formed as a three-dimensional open lattice structure having a plurality of elongate fibrous composite spindles extending in three dimensions, and wherein forming the web structure as the three-dimensional open lattice structure comprises:
forming a plurality of first open lattice panels, each of the plurality of first panels including a plurality of spindles extending within a plane defined by each of the plurality of first panels;
forming a plurality of second open lattice panels, each of the plurality of second panels including a plurality of spindles extending within a plane defined by each of the plurality of second panels;
orienting the plurality of first open lattice panels; and
orienting the plurality of second open lattice panels such the plurality of first panels intersects the plurality of second panels at multiple nodes to define the three-dimensional open lattice structure;
connecting the lower flange to a lower end of the web structure; and
connecting the upper flange to an upper end of the web structure,
wherein the open lattice structure is formed by continuous fiber-reinforced additive manufacturing, and
wherein each of the plurality of first panels defines a first extension direction and at least one of:
wherein each of the plurality of first panels includes a plurality of spindles non-perpendicular to the first extension direction, and a distribution of spindles is non-uniform in the first extension direction; or
the plurality of second panels is non-uniformly distributed in the first extension direction.

24. The method of claim 23, wherein forming the plurality of first panels further comprises, for each of the plurality of first panels, forming the plurality of spindles non-perpendicular to the first extension direction of the plurality of first panels.

25. The method of claim 24, wherein forming the plurality of first panels further comprises, for each of the plurality of first panels, forming the plurality of spindles perpendicular to the first extension direction.

26. The method of claim 24, further comprising non-uniformly distributing the spindles in the first extension direction.

27. The method of claim 26, further comprising in the first extension direction, providing a density of spindles in high load regions of the shear web greater than the density of the spindles in low load regions of the shear web.

28. The method of claim 23, wherein forming the plurality of second panels further comprises, for each of the plurality of second panels, forming a plurality of spindles non-perpendicular to a second extension direction of the plurality of second panels.

29. The method of claim 28, further comprising substantially uniformly distributing the spindles in the second extension direction.

30. The method of claim 28, further comprising uniformly distributing the spindles in the second extension direction.

31. The method of claim 30, further comprising in the second extension direction, providing a uniform density of spindles.

32. The method of any of claim 23, further comprising uniformly distributing the plurality of first panels in a second extension direction.

33. The method of claim 32, further comprising in the second extension direction, providing a uniform density of the plurality of first panels.

34. The method of claim 23, wherein providing the lower flange and the upper flange further comprises for each flange:
forming an open lattice panel; and
orienting the panel in the first extension direction,
wherein the open lattice panels that form the lower and upper flanges are formed by continuous fiber-reinforced additive manufacturing.

35. The method of claim 34, wherein forming the panels for the lower and upper flanges further comprises, for each of the panels, forming a plurality of spindles relative to the first extension direction of the panels.

36. The method of claim 35, further comprising non-uniformly distributing the spindles in the first extension direction.

37. The method of claim 36, further comprising in the first extension direction, providing a density of spindles in high load regions of the shear web greater than the density of the spindles in low load regions of the shear web.

38. The method of claim 23, wherein providing the lower and upper flanges further comprises forming an extension tab on each of the lower and upper flanges.

39. The method of claim 38, further comprising forming the extension tab with a widened portion.

40. The method of claim 38, further comprising arranging the spindles extending from the lower and upper flanges in a scalloped configuration adjacent an end of the lower and upper flanges including the extension tab.

41. The method of claim 23, further comprising:
forming the lower and upper flanges from a laminate composite construction or a pultruded construction;
forming the web structure from a laminate composite construction; and
forming the open lattice structure on at least one surface of the lower flange, upper flange, and the web structure.

42. The method of claim 41, further comprising forming the open lattice structure on opposed first and second surfaces of the web structure.

43. The method of claim 41, further comprising forming the open lattice structure on an outer surface of each of the lower and upper flanges.

44. A method of making a wind turbine blade, comprising:
forming a first blade half;
forming a second blade half;
forming a shear web;

connecting the shear web to the first blade half;
connecting the second blade half to the first blade half; and
connecting the shear web to the second blade half, and
wherein forming the shear web comprises:
providing a lower flange;
providing an upper flange;
providing a web structure configured to extend between the lower and upper flanges;
forming at least one of the lower flange, upper flange, and web structure with an open lattice structure having a plurality of elongate fibrous composite spindles intersecting each other at multiple nodes of the open lattice structure, wherein the web structure is formed as a three-dimensional open lattice structure having a plurality of elongate fibrous composite spindles extending in three dimensions, and wherein forming the web structure as the three-dimensional open lattice structure comprises:
forming a plurality of first open lattice panels, each of the plurality of first panels including a plurality of spindles extending within a plane defined by each of the plurality of first panels;
forming a plurality of second open lattice panels, each of the plurality of second panels including a plurality of spindles extending within a plane defined by each of the plurality of second panels;
orienting the plurality of first open lattice panels; and
orienting the plurality of second open lattice panels such the plurality of first panels intersects the plurality of second panels at multiple nodes to define the three-dimensional open lattice structure;
connecting the lower flange to a lower end of the web structure; and
connecting the upper flange to an upper end of the web structure,
wherein the open lattice structure is formed by continuous fiber-reinforced additive manufacturing, and
wherein, in a transition region adjacent a root end of the wind turbine blade, the plurality of spindles of the plurality of first panels, or of the plurality of second panels, or of both, extending from the lower and upper flanges have a scalloped configuration, and
wherein an end of the lower and upper flanges of the shear web which is configured to be located adjacent the root end of the wind turbine blade includes an extension tab.

45. The method of claim 44, wherein forming the first and second blade halves further comprises moulding each of the first and second blade halves.

46. The method of claim 44, further comprising:
forming the wind turbine blade as a first blade section and a second blade section configured to be joined at a connection interface, wherein the first and second blade sections include a first shear web portion and a second shear web portion, wherein at least the web structure of the first shear web portion and the web structure of the second shear web portion are configured to connect with each other in a nesting relationship; and
connecting the first blade section and the second blade section together at the connecting interface such that an arrangement of the spindles in the web structure of the first shear web portion and an arrangement of the spindles in the web structure of the second shear web portion are aligned across the connecting interface.

47. A wind turbine, comprising:
a tower;
a nacelle;
a rotor extending from the nacelle and carrying at least one wind turbine blade, the wind turbine blade comprising a shear web, the shear web comprising:
a lower flange;
an upper flange; and
a web structure extending between the lower and upper flanges, wherein at least one of the lower flange, upper flange, and the web structure includes an open lattice structure having a plurality of elongate fibrous composite spindles intersecting each other at multiple nodes of the open lattice structure, wherein the web structure includes a three-dimensional open lattice structure, and wherein the plurality of elongate fibrous composite spindles extends in three dimensions, and wherein the web structure further comprises:
a plurality of first open lattice panels, each of the plurality of first panels including a plurality of spindles extending within a plane defined by each of the plurality of first panels; and
a second plurality of open lattice panels, each of the plurality of second panels including a plurality of spindles extending within a plane defined by each of the plurality of second panels,
wherein the plurality of first panels intersects the plurality of second panels at multiple nodes to define the three-dimensional open lattice structure, and
wherein each of the plurality of first panels defines a first extension direction and the plurality of second panels is non-uniformly distributed in the first extension direction.

\* \* \* \* \*